(12) United States Patent
Sambasivan et al.

(10) Patent No.: US 7,682,700 B2
(45) Date of Patent: Mar. 23, 2010

(54) ALUMINUM PHOSPHATE COMPOUNDS, COMPOSITIONS, MATERIALS AND RELATED COMPOSITES

(75) Inventors: Sankar Sambasivan, Chicago, IL (US); Kimberly A. Steiner, Chicago, IL (US)

(73) Assignee: Applied Thin Films, Inc., Evanston, IL (US)

(*) Notice: Subject to any disclaimer, the term of this patent is extended or adjusted under 35 U.S.C. 154(b) by 765 days.

(21) Appl. No.: 10/642,069

(22) Filed: Aug. 14, 2003

(65) Prior Publication Data

US 2005/0106384 A1   May 19, 2005

Related U.S. Application Data

(60) Provisional application No. 60/403,470, filed on Aug. 14, 2002.

(51) Int. Cl.
*B32B 9/00* (2006.01)
(52) U.S. Cl. .................. 428/426; 428/432; 428/701; 428/702
(58) Field of Classification Search .................. None
See application file for complete search history.

(56) References Cited

U.S. PATENT DOCUMENTS

| | | | |
|---|---|---|---|
| 2,165,819 A | 7/1939 | Albers-Schonberg | |
| 3,323,889 A | 6/1967 | Carl et al. | |
| 3,450,574 A | 6/1969 | Reed | |
| 3,516,611 A | 6/1970 | Gatchet et al. | |
| 3,694,299 A | 9/1972 | Wagner | |
| 3,711,322 A | 1/1973 | Kushihashi et al. | |
| 3,793,105 A | 2/1974 | Birchall et al. | |
| 3,847,583 A | 11/1974 | Dislich et al. | |
| 3,870,737 A | 3/1975 | Birchall et al. | |
| 3,926,103 A | 12/1975 | Smith | |
| 3,943,231 A | 3/1976 | Wasel-Nielen et al. | |
| 3,960,592 A | 6/1976 | Birchall et al. | |
| 3,963,500 A | 6/1976 | Flowers et al. | |
| 3,984,591 A | 10/1976 | Plumat et al. | |
| 4,005,172 A | 1/1977 | Birchall et al. | |
| 4,005,232 A * | 1/1977 | Colebourne et al. | ........ 428/34.6 |
| 4,008,299 A | 2/1977 | Birchall et al. | |
| 4,289,863 A | 9/1981 | Hill et al. | |
| 4,303,732 A | 12/1981 | Torobin | |
| 4,336,338 A | 6/1982 | Downs et al. | |

(Continued)

FOREIGN PATENT DOCUMENTS

| | | |
|---|---|---|
| EP | 000302465 | 2/1989 |
| EP | 0539342 | 4/1993 |
| FR | 2156800 | 1/1973 |
| FR | 2176489 | 2/1973 |
| GB | 1192304 | 5/1970 |

(Continued)

OTHER PUBLICATIONS

Daviéro, S., Avinens, C., Ibanez, A., Giuntini, J.C., and Philippot, E., "Couches Minces Diélectriques de Phosphate d'Aluminum", J. Phys. III, Sep. 25, 1992, pp. 745-756. (English Abstract included).

(Continued)

*Primary Examiner*—Timothy M Speer
(74) *Attorney, Agent, or Firm*—Reinhart Boerner Van Deuren s.c.

(57) ABSTRACT

Composites and methods relating to the use of inventive aluminophosphate compounds and films thereof with glass, ceramic and non-oxide ceramic substrates.

44 Claims, 9 Drawing Sheets

Transmission electron micrograph of a thin coating of the inventive material on stainless steel.

U.S. PATENT DOCUMENTS

| | | | |
|---|---|---|---|
| 4,450,184 A | 5/1984 | Longo et al. | |
| 4,551,652 A | 11/1985 | Compen et al. | |
| 4,671,909 A | 6/1987 | Torobin | |
| 5,017,523 A | 5/1991 | Kimura et al. | |
| 5,030,431 A | 7/1991 | Glemza | |
| 5,146,743 A | 9/1992 | Maus et al. | |
| 5,208,069 A | 5/1993 | Clark et al. | |
| 5,223,336 A | 6/1993 | Griffith et al. | |
| 5,292,701 A | 3/1994 | Glemza et al. | |
| 5,348,694 A | 9/1994 | Goldberger | |
| 5,411,711 A | 5/1995 | Swars | |
| 5,496,529 A | 3/1996 | Fogel et al. | |
| 5,552,361 A | 9/1996 | Rieser et al. | |
| 5,614,255 A | 3/1997 | Kimura et al. | |
| 5,665,463 A | 9/1997 | Morgan et al. | |
| 5,698,758 A | 12/1997 | Rieser et al. | |
| 5,707,442 A | 1/1998 | Fogel et al. | |
| 5,713,974 A | 2/1998 | Martin et al. | |
| 5,744,777 A | 4/1998 | Bemecki et al. | |
| 5,833,728 A | 11/1998 | Kimura et al. | |
| 5,849,055 A | 12/1998 | Arai et al. | |
| 5,856,027 A | 1/1999 | Murphy | |
| 6,022,513 A | 2/2000 | Pecoraro et al. | |
| 6,036,762 A | 3/2000 | Sambasivan | |
| 6,110,528 A | 8/2000 | Kimura et al. | |
| 6,140,410 A | 10/2000 | Kolouch | |
| 6,162,498 A | 12/2000 | Mennig et al. | |
| 6,210,715 B1 | 4/2001 | Starling et al. | |
| 6,221,955 B1 | 4/2001 | Mequanint et al. | |
| 6,312,819 B1 | 11/2001 | Jia et al. | |
| 6,358,532 B2 | 3/2002 | Starling et al. | |
| 6,379,746 B1 | 4/2002 | Birch et al. | |
| 6,383,989 B2 | 5/2002 | Jia et al. | |
| 6,403,164 B1 | 6/2002 | Jonschker et al. | |
| 6,461,415 B1 | 10/2002 | Sambasivan et al. | |
| 6,554,948 B1 | 4/2003 | Ferrier | |
| 6,589,661 B2 | 7/2003 | Neely, Jr. et al. | |
| 6,692,678 B2 | 2/2004 | Krowl et al. | |
| 6,770,325 B2 * | 8/2004 | Troczynski et al. | 427/376.2 |
| 2002/0004111 A1 | 1/2002 | Matsubara et al. | |
| 2002/0054884 A1 | 5/2002 | Peetermans et al. | |
| 2004/0011245 A1 | 1/2004 | Sambasivan et al. | |
| 2004/0258601 A1 | 12/2004 | Matsubara et al. | |

FOREIGN PATENT DOCUMENTS

| | | |
|---|---|---|
| GB | 1322722 | 7/1973 |
| GB | 1322724 | 7/1973 |
| GB | 1322726 | 7/1973 |
| GB | 1396795 | 6/1975 |
| GB | 1451145 | 9/1976 |
| GB | 2021544 | 12/1979 |
| JP | 53011200 | 2/1978 |
| JP | 401036774 | 2/1989 |
| JP | 02142881 | 5/1990 |
| JP | 5229911 | 7/1993 |
| RU | 2148017 | 4/2000 |
| WO | WO 9821797 | 5/1998 |
| WO | WO9821797 | 5/1998 |
| WO | WO 0142881 | 6/2001 |
| WO | WO0142881 | 6/2001 |
| WO | WO0216263 | 2/2002 |
| WO | WO 0216263 | 2/2002 |

OTHER PUBLICATIONS

Rothon, Roger N., "Novel, Low Curing Temperature, Glassy, Inorganic Coatings, Derived from Soluble Complexes of Aluminum and Other Metal Phosphates", Chemistry and Industry, Jun. 1, 1974, pp. 457-459.

Daviéro, S., Avinens, C., Ibanez, A., Giuntini, J.C., and Philippot, E., "Dielectric Properties of Amorphous Aluminum Phosphate Thin Films", Journal of Non-Crystalline Solids 146, 1992, pp. 279-284.

Daviéro, S., Avinens, C., Ibanez, A., Giuntini, J.C., and Philippot, E.,, "A Structural Study of Amorphous Aluminum Phosphate Thin Films by X-Ray Absorption Spectroscopy", Thin Solid Films, 226, 1993, 207-214.

Weber, Ch., Field, R., and Höfer, H.H., "Characterization of Aluminum Phosphate Gel", Key Engineering Materials, vol. 150, 1998, pp. 199-208.

U.S. Appl. No. 10/627,194, Sambasivan et al.

U.S. Appl. No. 10/642,069, Sambasivan et al.

U.S. Appl. No. 10/266,832, Sambasivan et al.

Francis, Lorraine Falter, "Sol-Gel Methods for Oxide Coatings", Materials and Manufacturing Processes, vol. 12, No. 6, 963-1015, 1997, Copyright 1997 by Marcel Dekker, Inc.

Rothon, Roger N., "Novel, Low Curing Temperature, Glassy, Inorganic Coatings, Derived from Soluble Complexes of Aluminum and Other Metal Phosphates", Chemistry and Industry, Jun. 1, 1974, pp. 457-459.

Gugleilmi, Massimo, "Sol-Gel Coatings on Metals", Journal of Sol-Gel Science and Technology 8, 443-449 (1997), Copyright 1997 Kluwer Academic Publishers. Manufactured in The Netherlands.

Livage, J.; Barboux, P.; Vandenborre, M.T.; Schmutz, C.; Taulelle, F., "Sol-Gel Synthesis of Phosphates", Journal of Non-Crystalline Solids 147 & 148 (1992) 18-23, Elsevier Science Publishers B.V.

Lee, D.H.; Condrate, SR., R.A.; Lacourse, W.C.; "FTIR Spectral Characterization of Thin Film Coatings of Oleic Acid on Glasses", Journal of Materails Science 35 (2000 4961-4970, Copyright 2000 Kluwer Academic Publishers.

Wilcox, David L.; Berg, Morris; "Microsphere Fabrication and Applications: An Overview", Mat. Res. Soc. Sump. Proc. vol. 372, Copyright 1995 Materials Research Society.

Moh, Kyung H.; "Sol-Gel Derived Ceramic Bubbles", Mat. Res. Soc. Symp. Proc. vol. 372, Copyright 1995 Materials Search Society.

Kim, Keykyoon (Kevin), "Fabrication of Glass and Micro- and Nanospheres from Liquid Precursors Using Droplet Generation and Sol-Gel Processing", Mat. Res. Soc. Symp. Proc. vol. 372. Copyright 1995 Materials Research Society.

Hagarman, James A.; "Hollow Borosilicate Microspheres from Aqueous Solution" Mat. Res. Soc. Symp. Proc. vol. 372, Copyright 1995 Materials Research Society.

Lui, Jay G.; Wilcox, SR., David L.; "Design Guidelines and Water Extraction Synthesis Capabilities for Hollow Ceramic Microspheres for Low Dielectric Constant Inorganic Substrates", Mat. Res. Soc. Symp. Proc. vol. 372, Copyright 1995 Materials Research Society.

Japp, Robert M.; Papathomas, Kostas I.; "Low Dielectric Constant Laminates Containing Microspheres", Mat. Res. Soc. Symp. Proc. vol. 372, Copyright 1995 Materials Research Society.

Farooqui, M.M.; Evans, A.G.R.; "Solid and Hollow Micro and Spherical Structures in Polysilicon and phosphosilicate Glass", Mat. Res. Soc. Symp. Proc. vol. 372, Copyright 1995 Materials Research Society.

Japp, Robert M.; Papathomas, Kostas I.; "Low Dielectric Constant Laminates Containing Microspheres" Mat. Res. Soc. Symp. Proc. vol. 372, Copyright 1995 Materials Research Society.

Liu, Jay G.; Wilsox, Sr. David L., "Design Guidelines and Water Extraction Synthesis Capabilities for Hollow Ceramic Microspheres for Low Dielectric Constant Inorganic Substrates", Mat. Res. Soc. Symp. Proc. vol. 371, Copyright 1995 Materials Research Society.

Kellerman, David W.; "Review of Low Dielectric Constant Thick Film Electronic Ceramics using Hollow Microspheres", Mat. Res. Soc. Symp. Proc. vol. 372, Copyright 1995 Materials Research Society.

Webpage at http://adt.lib.swin.ed.au/uploads/approved/adt-VSWT20031218,142251/public/03chapter2.pdf, "Chapter 2. Experimental"; Dec. 18, 2003.

3M, "3M Ceramic Microspheres, Paints and Coatings Applications Profile", 3M Performance Materials Division, 3M Center, Building 223-6S-04, St. Paul, MN 55144-1000, www.3m.com/paintsandcoatings, issued Nov. 2003, Copyright 2003 3M.

Kim, S.H.; Liu, B.Y.H.; Zachariah, M.R.; "Synthesis of Nanoporous Metal Oxide Particles by a New Inorganic Matrix Spray Pyrolysis Method", Chem. Matter, 2002, 14, 2889-2899, Copyright 2002 American Chemical Society, Published on Web Jun. 17, 2002.

Tan, Qui, "Spray Drying Dielectric Ceramics", www.ceramicbulletin.org, Sep. 2004, CTS Communication Components, Inc., Albuquerque, NM.

Bertrand, G.; Roy, P.; Filiatre, C.; Coddet, C.; "Spray-Dried Ceramic Powders: A Quantitative Correlation Between Slurry Characteristics and Shapes of the Granules", Chemical Engineering Science 60 (2005) 95-102.

Moiseev, S.S.; Petrov, V.A.; Stepanov, S.V., "The Optical Properties of Heat-Insulating Ceramics Made of Microballoons of Aluminum Oxide", High Temperature vol. 41, No. 1, 2004, pp. 139-145. Copyright 2004 Russian Academy of Sciences and Kluwer.

Carlson, Krista; Webpage at ceer.alfred.edu/Research/Summer/carlsonreport.doc, "Production of Hollow Glass Microspheres from Amber Glass Frit".

Cochran, Joe K., "Ceramic Hollow Spheres and Their Applications", School of Materials Science and Engineering, Georgia Institute of Technology, Atlanta, GA 30332-0245, USA, Copyright Current Chemistry Ltd ISSN 1359-0286.

Lima, R.S.; Marple, B.R.; "From APS to HVOF Spraying of Conventional and Nanostructured Titania Feedstock Powders: A Study on the Enhancement of the Mechanical Properties", Surface & Coatings (2004) Copyright 2004 Elsevier B.V.

Bertling, Jurgen; Blumer, Jan; Kummel, Rolf, "Hollow Microspheres", Chem. Eng. Technol. 2004, 27, No. 28, Copyright 2004 Wiley-VCH Verlag GmbH & Co. KGaA, Weinheim.

Dombrovsky, L.A.; "Approximate Models of Radiation Scattering in Hollow-Microsphere Ceramics", High Temperature, vol. 42, No. 5, pp. 776-784, Copyright 2004 Russian Academy of Sciences and Springer Science.

"Outline of Impact Blasting", Copyright Pil 1990.

Sepvolgyi, J.; Karoly, Z., "Preparation of Hollow Alumina Microspheres by RF Thermal Plasma", Key Engineering Materials, vols. 264-268 (2004) pp. 101-104, Copyright 2004 Trans Tech Publications, Switzerland.

Shabde, V.S.; Mann, U.; Hoo, K.A.; "Numerical Solution of a Model Associated with the Production of Hollow Micro-particles", Department of Chemical Engineering, Texas Tech University, Lubbock, TX 79409, 2004 AlChE National meeting, Session 169, Paper 169I.

Lange, S.; Schweiger, G.; "Thermal Radiation from Spherical Microparticles: A New Dipole Model", 2444 J. Opt. Soc. Am. B/vol. 11, No. 12/Dec. 1994, Copyright 1994 Optical Society of America.

Orel, Zorica Crnjak; Gunde, Marta Klanjsek; "Spectrally Selective Paint Coatings: Preparation and Characterization", Solor Energy Materials & Solar Cells 68 (2001) 337-353; Copyright 2001 Elsevier Science B.V.

Lima, R.S.; Marple, B.R.; "Near-Isotropic Air Plasma Sprayed Titania", Acta Materialia 52 (2004) 1163-1170, Published by Elsevier Ltd on behalf of Acta Materialia Inc.

Luo, P.; Nieh, T.G.; "Preparing Hydroxyapatite Powders with Controlled Morphology", Biomaterials 17 (1996) 1959-1964, Copyright 1996 Elsevier Science Limited.

Baillis, Dominique; Sacadura, Jean-Francois; "Thermal Radiation Properties of Dispersed Media: Theoretical Prediction and Experimental Characterization", Journal of Quantative Spectroscopy & Radiative Transfer 67 (2000) 327-363, Copyright 2000 Elsevier Science Ltd.

Conduct-O-Fil Conductive Additives, "Conduct-O-Fil Silver-Coated Hollow Glass Spheres", Potters Industries, Inc., an Affiliate of PQ Corporation, Valley Force, PA 19482-0840.

Ding, Xuefend; Yu, Kaifeng; Jiang, Yanqiu; Zhang, Hari-Bala Hengbin; Wang, Zichen; "A Novel Approach to the Synthesis of Hollow Silica Nanoparticles", Materials Letters 58 (2004) 3618-3621, Copyright 2004 Elsevier B.V.

Dombrovsky, L.A.; "Modeling of Thermal Radiation of Polymer Coating Containing Hollow Microspheres", High Temperature, vol. 34, No. 2, 2005, pp. 247-258. Copyright 2005 Russian Academy of Sciences and Springer Science.

Sizgek, E.; Bartlett, J.R.; "Production of Titanate Microspheres by Sol-Gel and Spray-Drying", Journal of Sol-Gel Science and Technology 13, 1011-1016 (1998), Copyright 1998 Kluwer Academic Publishers, Manufactured in The Netherlands.

* cited by examiner

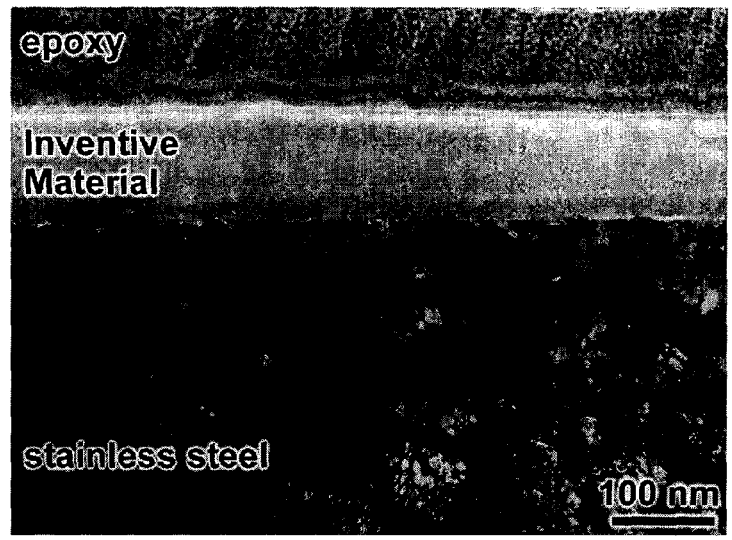
Figure 1. Transmission electron micrograph of a thin coating of the inventive material on stainless steel.
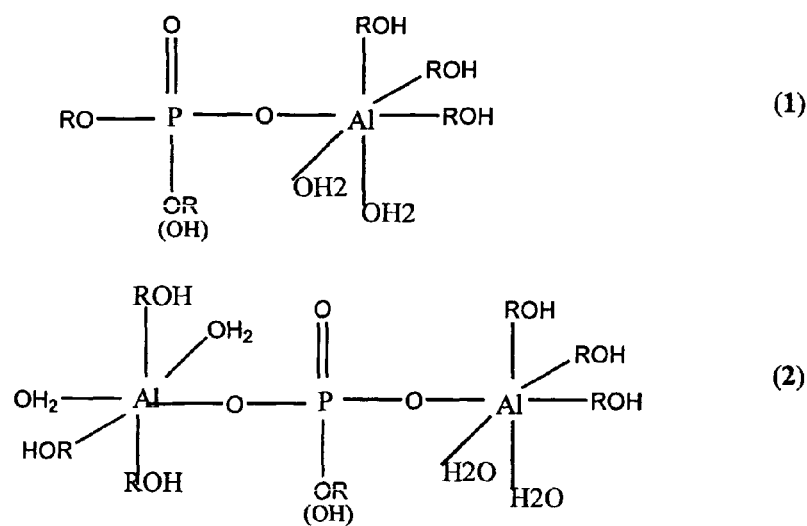
Figure 2. Aluminophosphorus complexes present in the precursor solution of the Inventive Material.

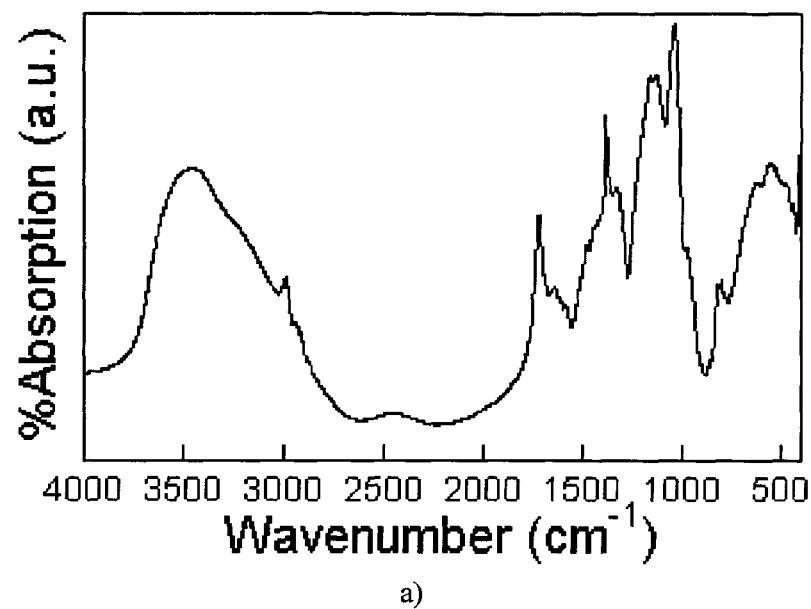
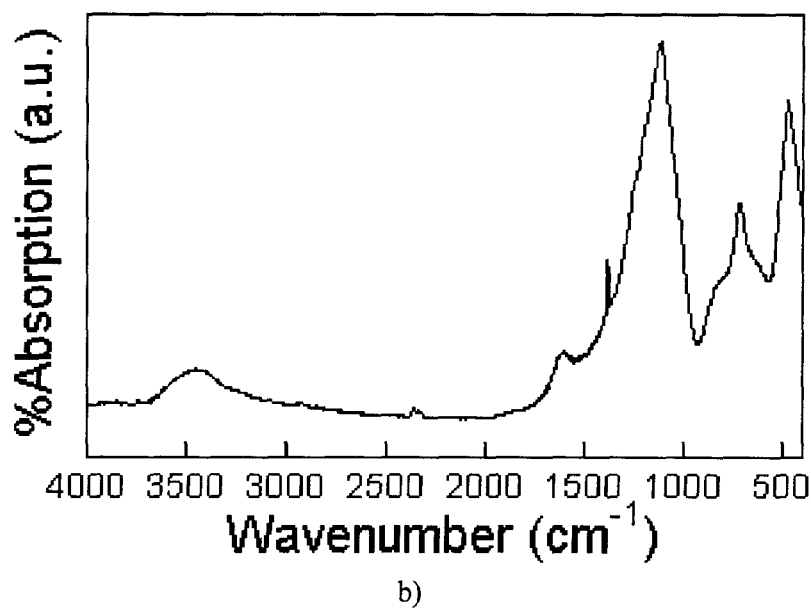
Figure 3. FTIR spectra of the Inventive Material phase with Al/P = 1.75/1 heat treated at (A) 150° C (B) 1100° C.

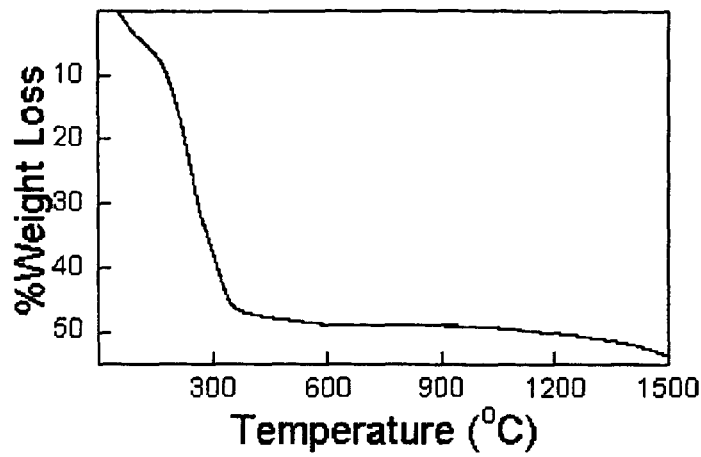
Figure 4. Thermogravimetric analysis of the inventive material, indicating substantial weight loss by 350° C.
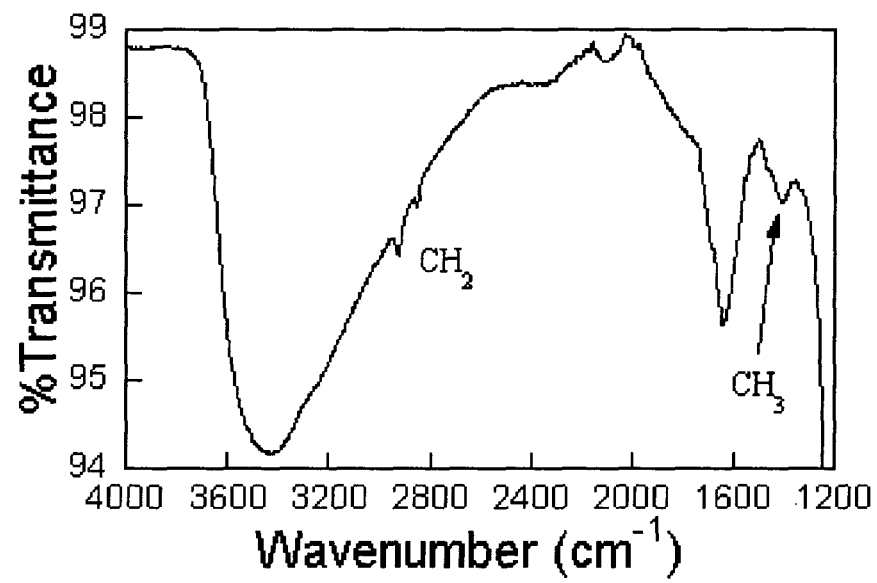
Figure 5. FTIR spectrum of coated glass slides of Example 4, showing organic groups bonded to the surface.

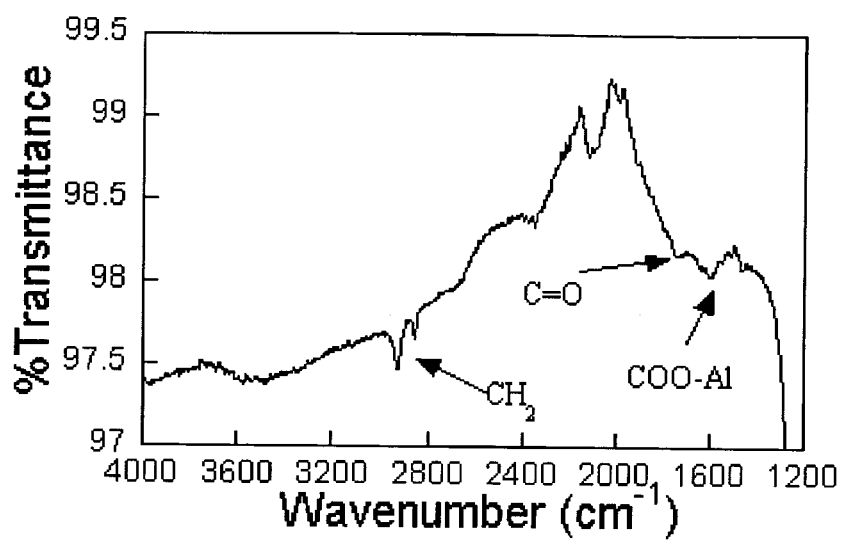
Figure 6. Attenuated total reflectance spectrum of inventive material coated glass slide with self assembled Oleic acid layer.

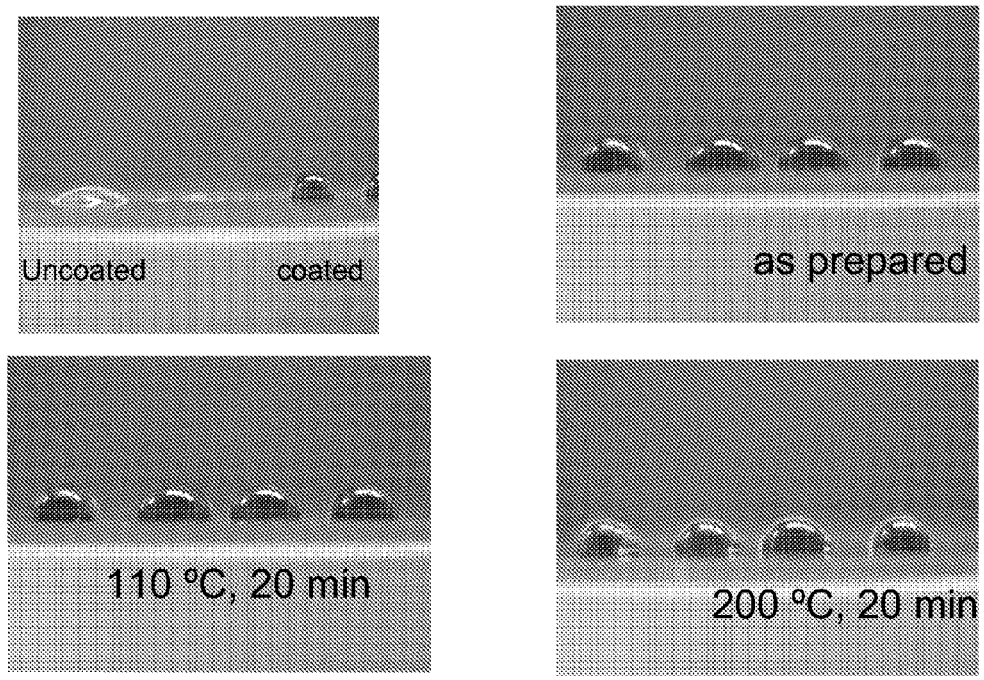
Figure 7. Photographs showing contact angle of water on octadecyl trichloro silane coated inventive material coated glass. a) as-deposited, with uncoated section b) as prepared (no heat treatment) c) after 110°C, 20 min heat treatment d) after 200°C, 20 min heat treatment.

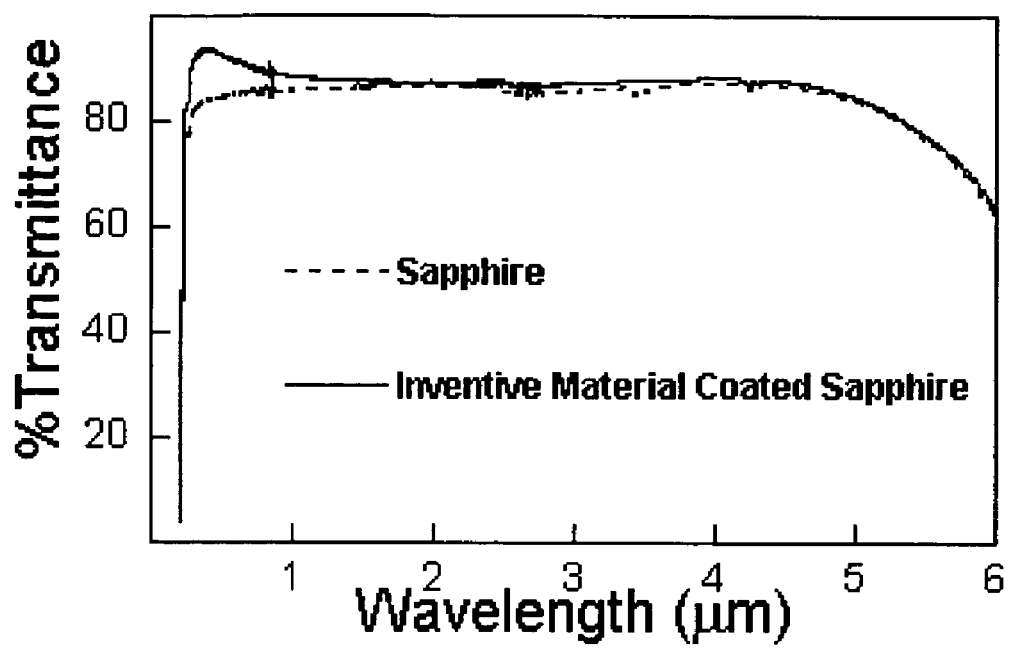
Figure 8. Spectrum showing transparency of inventive material.

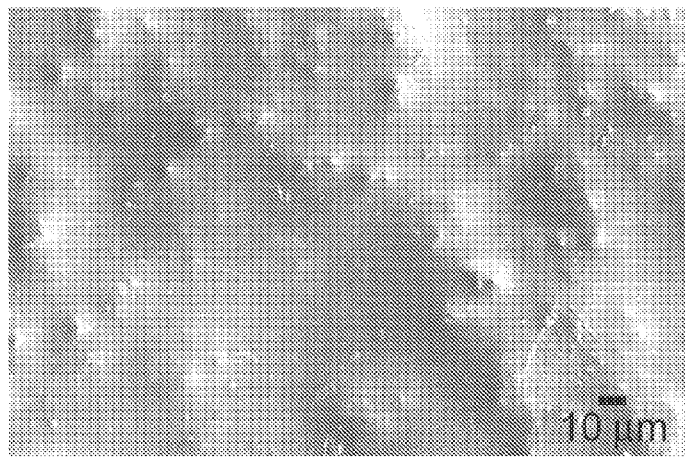
a)
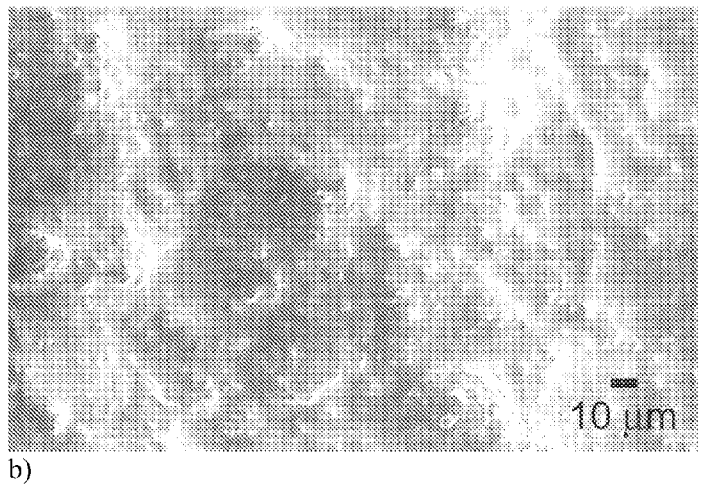
b)
Figure 9. SEM micrographs showing a) coated and b) uncoated unglazed ceramic tile.

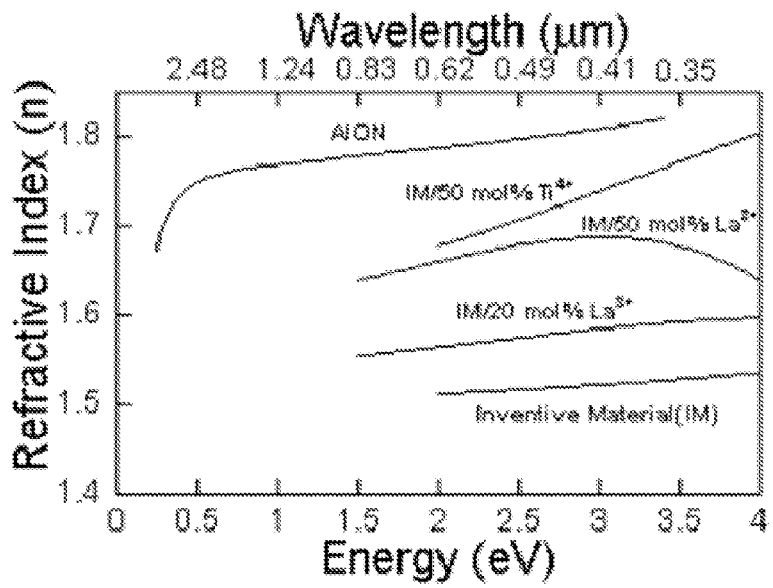
Figure 10. Refractive index with energy for inventive material, inventive material doped with 20 mol% and 50 mol% lanthanum and inventive material doped with 50 mol% titanium.
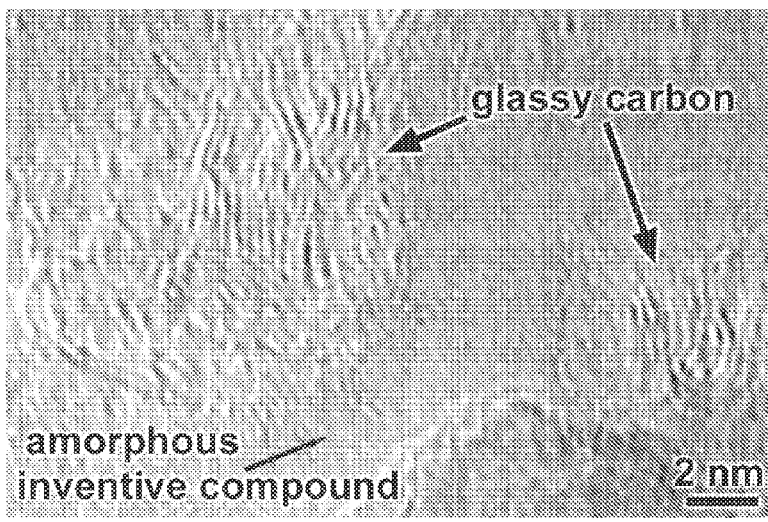
Figure 11. Transmission electron micrograph of carbon nanoinclusions in the inventive material.

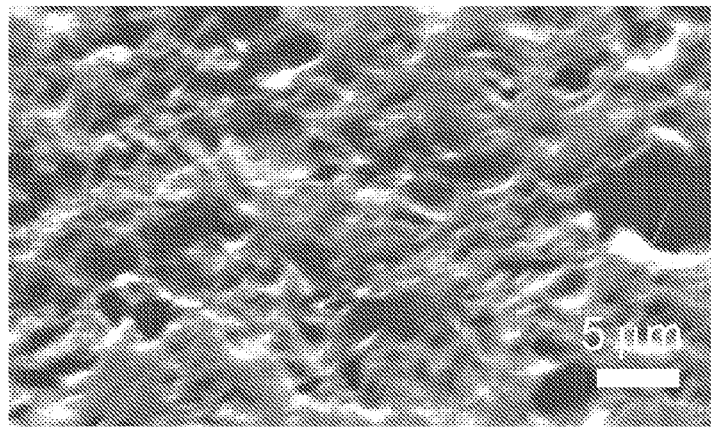
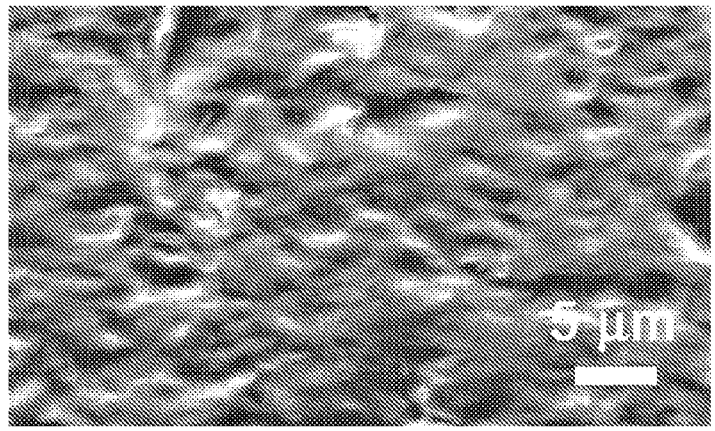
Figure 12. SEM image of a) uncoated silicon carbide and b) coated silicon carbide, demonstrating the ability of the inventive material to seal pores and defects.

ALUMINUM PHOSPHATE COMPOUNDS, COMPOSITIONS, MATERIALS AND RELATED COMPOSITES

This application claims priority benefit from provisional application Ser. No. 60/403,470 filed Aug. 14, 2002, the entirety of which is incorporated herein by reference; U.S. application Ser. No. 10/627,194 filed Jul. 24, 2003 from prior provisional application Ser. No. 60/398,265 filed Jul. 24, 2002; and U.S. application Ser. No. 10/362,869 filed Feb. 21, 2003 from prior PCT application no. PCT/US01/41790 filed Aug. 20, 2001, each of which is incorporated by reference in its entirety.

The United States government has certain rights to this invention pursuant to Grant Nos. F49620-00-C-0022 and F49620-01-C-0014 from AFOSR (Air Force Office of Scientific Research) to Applied Thin Films, Inc.

FIELD OF THE INVENTION

The present invention primarily relates to use of microstructurally dense aluminophosphate coatings or films on ceramics and glasses to serve as diffusion barrier against wear, corrosion, oxidation or exposure to other harsh environments. The invention also relates to modifying glass and ceramic surfaces, with the use of aforementioned films or coatings; to impart hydrophobic or non-stick or non-wetting or high emissivity properties and to provide physical planarization of said substrates.

BACKGROUND OF THE INVENTION

There are a number of prior art patents related to synthesis of aluminum phosphate materials primarily for use as a catalyst support including crystalline and amorphous forms. Most synthetic methods comprise of using a sol-gel technique with raw materials that include commonly available salts of aluminum and a variety of phosphorous sources including phosphoric acid, ammonium hydrogen phosphates, phosphorous acid, and others. Many of these methods yield highly porous and crystalline forms and few thermally stable amorphous compositions (U.S. Pat. No. 4,289,863, Hill et al.; U.S. Pat. Nos. 5,698,758 and 5,552,361, both Rieser et al.; U.S. Pat. No. 6,022,513, Pecoraro et al. U.S. Pat. No. 3,943,231, Wasel-Nielen et al.; U.S. Pat. No. 5,030,431, Glemza; U.S. Pat. No. 5,292,701, Glemza et al.; U.S. Pat. No. 5,496,529 and U.S. Pat. No. 5,707,442, both Fogel et al.). Two prior art patents do teach formation of amorphous aluminum phosphate compositions. However, the materials derived are highly porous which are desired for catalytic applications. U.S. Pat. No. 4,289,863, teaches a new method for synthesizing amorphous Al-rich AlPO4 compositions which are more thermally stable than Al-poor compositions which crystallize at much lower temperatures. U.S. Pat. No. 6,022,513, teaches a slightly modified method for making Al-rich compositions which yields a microstructurally different form of amorphous aluminophosphate material. However, both synthetic methods yield highly porous materials with surface areas over 90 to 300 square meters per gram with a macropore volume of at least 0.1 ccs per gram as shown in the Pecoraro patent. (pores are said to be between 60 nm to 1000 nm in U.S. Pat. No. 5,698,758).

Much of the utility of such prior art amorphous materials is related to their use as thin films on metals & alloys, glass, and ceramic substrates. To facilitate this utility, a combination of additional attributes would be advantageous including a stable and low-cost precursor solution and an environmentally-friendly, cost-effective, and versatile coating process providing good adhesion with aforementioned substrates. There is a growing need for coatings on glass and ceramic substrates to provide protection and to perform other surface-related functions. The primary advantage of an amorphous coating is that, if developed by a suitable process, it can provide a hermetic seal over a substrate such that access of gas or liquids that can potentially corrode the substrate is avoided. Many methods have been developed to deposit uniform crystalline coatings that are substantially pore or crack-free. Crystalline coatings do not provide hermetic protection from gas or liquid exposures.

Silica-based amorphous coatings have been developed and a recent patent prescribes a unique way to deposit such coatings (U.S. Pat. No. 6,162,498). However, the coating is not durable under certain harsh conditions and are not thermally stable at elevated temperatures or do not serve adequately as a transparent coating on glass due to processing limitations. In addition, silica is not chemically compatible with many ceramic materials at elevated temperatures and is also prone to decomposition in water vapor atmospheres (converted to hydroxide vapors). High temperature stable glassy or vitreous coatings have also been developed by initially coating substrates with a slurry of glass frits and subsequently treating the coated material to high enough temperatures to melt the glass frits and form the vitreous coating. Vitreous enamel coatings have been in existence for many decades with many different compositions. However, they are usually thick and are porous and deform at elevated temperatures. Although hermetic protection may be achieved with this process, the requirement of high temperature processing to melt the glass frits may degrade the substrate and if low melting glass compositions are selected, they may not be durable due to the presence of sodium.

Prior art coatings have also included amorphous aluminum phosphate on metals derived from various methods. British Pat. Nos. 1,322,722, 1,322,724, and 1,322,726, and published article entitled "Novel, low curing temperature, glassy, inorganic coatings, derived from soluble complexes of aluminum and other metal phosphates", (Chemistry and Industry, vol. 1, (1974) 457-459) disclose utilizing a soluble polymer complex comprising of aluminum phosphate with HCl and hydroxyl-organic ligand. Although dense amorphous aluminum phosphate films have been reported utilizing this method, there are several shortcomings which relate to their poor performance and make it impractical for commercial use. First, the films contain residual chlorine (minimum of one weight %) which is not desirable for many metals and alloys. Second, as the film cures, toxic HCl gas is released (complex contains one mole HCl for every mole of $AlPO_4$) which is a significant environmental concern. Third, the synthetic process is relatively complex involving isolation of the complex in crystalline form and then dissolving it in appropriate solvents making it difficult to implement in practical applications.

Inert and/or vacuum treatments are necessary to produce the precursor in the aforementioned prior art and, in addition, it is not clear whether the prepared precursor solution has sufficient shelf stability, or if the solution decomposes upon exposure to the ambient (a potential concern due to the presence of volatile organics, such as ethanol, present as a ligand). No specific examples were given related to deposition of films on metal substrates or their corresponding behavior in an oxidation or corrosion tests. Due to the highly acidic nature of the precursor solution, glass and ceramic substrates may be subjected to significant corrosion from chloride attack during film development. In addition, due to the lower curing temperature, adhesion to substrates may not be sufficiently high to yield durable films. Although curing temperatures ranging from 200-500° C. were suggested, most often curing temperatures below 200° C. were used and no specific example of films cured at 500° C. was provided and no microstructural information was given. In addition, the coatings were found to adhere to molten aluminum. However, Aluminum phosphate, in pure crystalline or amorphous forms, is chemically compatible with molten aluminum and has been found to be non-wetting due to low surface energy. Based on the poor adhesion of the prior art coatings, it is suspected that the coating is not chemically durable (due to presence of chlorine or poor film coverage or poor high temperature properties) and that the surface energy is not sufficiently low such that its applicability for non-stick or non-wetting applications may not be exploited.

In the aforementioned prior art, in addition, silicon and boron additions were needed to extend the amorphous nature of the material. Even with these additions, sufficient crystalline content (tridymite and cristobalite) was present after annealing the powder materials to 1090° C. for 3 hours. As explained below, for the present invention, substantial amounts of non-crystalline content with only the presence of tridymite phase were found for materials with varying Al/P stoichiometry after heat treatment at much higher temperatures and extended time periods. It is not uncommon that amorphous materials produced using various techniques may have distinct structural or network moieties such that their atom diffusivities and high temperature behavior may vary significantly. It appears that the network structure of the material derived under the aforementioned patent does not provide for a robust microstructure and may not be suitable for use especially at elevated temperatures.

Thus, the material produced in prior-art methods is not microstructurally dense or robust enough to provide the desired protection. In addition, none of the prior art methods provide a suitable process or precursor solution that is economical, stable and clear, and can be applied using a variety of well-known techniques such as dip, spray, brush, and flow. Furthermore, none of the processes associated with prior art methods offer the ability to provide good adhesion with substrates that is critically important for most applications. The prior art coatings are either not durable under certain atmospheric conditions or under certain harsh industrial or use environments where materials are subjected to thermal treatments or exposed to corrosive environments. Prior art inorganic coatings are also not completely transparent for use on glass where transmission properties are affected or other substrates where aesthetic property of the substrate (metallic appearance) needs to be preserved.

The technical demands on the glass industry are growing for display technologies, energy-efficient windows, efficient solar panels, mirrors and lenses, and other specialty products. It is anticipated that suitable coatings with multifunctional properties (for example, good diffusion barrier characteristics and provide antireflective properties) will be needed to meet the demands of performance, durability, and cost. The currently-available commercial coatings do not adequately provide the combination of desirable properties, in addition to, not providing simple and low-cost processes for deposition of multifunctional thin films.

The container market, for example, use coatings to strengthen the glass and prevent it from shattering during the manufacturing and handling. The flat-glass market has numerous products, whose performance and lifetime directly depends on the quality of the coating. Low-E coatings (which transmit visible light while minimizing the transmittance of other wavelengths of light, such as light in the infrared spectrum) or electrochromic coatings (also called "smart windows"), whose improved transmission properties will yield energy savings. Another application has raised the interest of the flat-glass manufacturers: easy-to-clean or self-cleaning windows for homes and buildings, lenses and mirrors for the optical industry. Self-cleaning or easy-to-clean coatings are designed to improve visibility, lower labor costs, minimize detergent use and to allow efficient performance of underlying optical coatings. The extant coating technologies, whether hydrophilic or hydrophobic (In the case of hydrophobic coatings, organic or polymer coatings form a water-repellent surface. Hydrophilic coatings combined the action of a photocatalyst, mostly $TiO_2$, with hydrophilic properties of the surface to clean away the loosen dirt with water) suffer from severe limitations in either process or performance.

Although several prior art patents (U.S. Pat. No. 6,379,746, PCT Application: WO 2001-US42881, PCT Application: WO 98-US21797) relate to the development of coatings for specifically addressing various issues aforementioned, no suitable multifunctional coating material is presently available that meets more than one requirement and can be deposited using a low-cost and simple deposition process. In addition, most glass articles comprise of soda-lime glass which contain sodium ions that diffuse into coating layers being deposited leading to deterioration of functional properties. For example, transparent conductive oxides (such as indium tin oxide) are used in a variety of glass products to limit IR radiation or to serve as conductive layers in display devices or solar cells do not perform adequately due to the diffusion of sodium from the substrate. Thus, a robust diffusion barrier layer on glass is needed to fully exploit the functionality of overlayers being deposited.

Ceramic articles are used in a number of industries including tiles, porcelain, refractories, bricks, furnace liners, and other specialty products. Such ceramic articles produced by any number of processes are porous and rough, thus requiring a glaze coating that provide resistance against staining, scratching, UV radiation, and fire. In addition, they are not easy to clean as dirt or foreign particles absorb into the pores rather easily. Glazing of such ceramic surfaces to provide a seal coat are used extensively. However, the performance of such glazes are rather poor and are typically thick coatings which alter the surface morphology significantly such that anti-slip properties are compromised. In addition, certain glazes are polymer-based and are not durable.

Porcelain enamel coatings are used extensively in the ceramic industry (including, but not limited to, BBQ & stove grills, household appliances, chemical, heat treating, metal, and molten metal processing industries). Bulk of these coatings are porous which result in their poor performance (moisture absorption, dirt collection, etc.). In addition, the surfaces are not suitably non-wetting or non-stick or hydrophobic.

In addition, many ceramic materials are used in high temperature applications. Non-oxide ceramic materials, such as silicon nitride, silicon carbide, and their related composite materials are known for their excellent mechanical (creep resistance and strength at elevated temperatures) and thermal shock properties. However, these materials are subject to environmental degradation and rapid oxidation in harsh and oxidizing environments. A suitable coating that provides oxidation or corrosion protection is highly desirable. Currently-used protective coatings are thick and are prone to cracking. A thin, thermally stable, and microstructurally dense amorphous film with low oxygen diffusivity or atom mobility can provide excellent protection. In addition, suitable dielectric layers are being sought for silicon carbide based semiconductors for high temperature applications. Silica is commonly used as a dielectric layer for silicon-based devices and is generated by controlled thermal oxidation of silicon. However, such films cannot be thermally grown on SiC that yield the desirable dielectric properties (low dielectric constant).

Finishing polishing of optical materials, such as lenses and radomes, is a significant challenge, particularly substrates that are hard and are polycrystalline in nature such as AlON and spinel materials used in radomes. Depositing an amorphous glassy layer with appropriate optical or electrical properties will enable ease of polishing using magnetic rheological fluids (MRF) polishing or other mechanical techniques to achieve the desired rms roughness value for the final optical surface. The glassy layer can seal defects, sub-surface damage on the substrate surface, and grain-boundary junctions.

Thus, there is a need to develop oxide coatings using low-cost, versatile, and simple processes to enable the aforementioned applications.

BRIEF DESCRIPTION OF THE DRAWINGS

FIG. 1. Transmission electron micrograph of a thin coating of the inventive material on stainless steel.

FIG. 2. Aluminophosphorus complexes present in the precursor solution of the Inventive Material.

FIG. 3. FTIR spectra of the Inventive Material phase with Al/P=1.75/1 heat treated at (A) 150° C. (B) 1100° C.

FIG. 4. Thermogravimetric analysis of the inventive material, indicating substantial weight loss by 350° C.

FIG. 5. FTIR spectrum of coated glass slides of Example 4, showing organic groups bonded to the surface.

FIG. 6. Attenuated total reflectance spectrum of inventive material coated glass slide with self assembled Oleic acid layer.

FIG. 7. Photographs showing contact angle of water on octadecyl trichloro silane coated inventive material coated glass. a) as-deposited, with uncoated section b) as prepared (no heat treatment) c) after 110° C., 20 min heat treatment d) after 200° C., 20 min heat treatment.

FIG. 8. Spectrum showing transparency of inventive material.

FIG. 9. SEM micrographs showing a) coated and b) uncoated unglazed ceramic tile.

FIG. 10. Refractive index with energy for inventive material, inventive material doped with 20 mol % and 50 mol % lanthanum and inventive material doped with 50 mol % titanium.

FIG. 11. Transmission electron micrograph of carbon nanoinclusions in the inventive material.

FIG. 12. SEM image of a) uncoated silicon carbide and b) coated silicon carbide, demonstrating the ability of the inventive material to seal pores and defects.

FIG. 13. ATR spectrum of inventive aluminophosphate material coated silicon carbide

OBJECT OF THE INVENTION

In light of all the shortcomings of prior art discussed above, there is a need for a stable and microstructurally dense form of aluminophosphate which is chemically durable and thermally stable for use in a broad range of applications. Accordingly, it is an object of this invention to provide an amorphous aluminophosphate compound, composition and/or material is particularly relevant for developing protective, functional, and multifunctional substrate coatings. Thus, there is a need to develop a durable glassy coating that is dense, smooth, continuous, hermetic or substantially pore-free, and transparent which can be deposited on a variety of substrates with excellent adhesion and at low cost with a simple environmentally friendly process. Most of the current and emerging applications utilizing glass/ceramic substrates will require coatings that are multifunctional such that other properties along with corrosion protection can be induced. For example, antibacterial coatings are desired to limit the spread of bacteria and diseases for metal substrates. It would be desirable to develop a coating that provides both corrosion and antibacterial protection. Thus, a thermally stable and robust glassy coating material need be developed with an associated precursor system that can be flexible to induce multifunctional properties, and is practical for use in industry and commercial applications, that also offer low cost, simplicity, and environmental compliance.

It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is a further object of the present invention to develop a (preferably transparent) glassy coating system which provides effective corrosion protection for a very wide variety of glass, ceramic and/or non-oxide ceramic substrates, preferably in combination with abrasion resistance properties.

In accordance with the invention it has been found that this object may be achieved by depositing an alumino-phosphate coating on glass or ceramic substrates. Owing to the inorganic network, the resultant coatings also possess abrasion resistance properties, which may be strengthened further by incorporating nanoscale particles. Another effect of incorporating the nanosized particles is that such coatings remain transparent. The present invention accordingly provides a process for depositing amorphous aluminophosphate films with many desirable multifunctional properties.

According to the present invention it has now been found that by using specific precursors, vitreous layers can be formed on glass or ceramic surfaces, which layers may be dimensioned less than about 10 microns. Surprisingly it has also been found that such layers can be converted into dense aluminum-phosphate films. Such films are about a few nanometers to about a few microns in thickness and form a hermetically sealing layer which prevents or drastically reduces, respectively, the access of moisture or gases to substrate surface and secures an excellent protection against corrosion even at elevated temperatures. Such layers are furthermore abrasion-resistant. Another objective of the present invention is to develop a stable and microstructurally dense form of aluminophosphate material for use in the aforementioned applications.

A further objective of the invention is to develop a low-cost, simple, and versatile chemical-solution based method to develop the amorphous material in the form of powder, coating, fiber, and bulk materials.

A yet another objective of the invention is to prepare a suitable clear precursor solution that yields high quality dense coatings of amorphous aluminophosphate. A further objective is to develop suitable precursor solutions such that other additives can be added to the solution such that new amorphous aluminophosphate compositions can be made. The additives can be added in a chemical form such that the solution is clear or the additives can be added in colloidal or powder form to yield a slurry-based solution. In any of the precursor forms used, a cured material obtained may be in the form of a nanocomposite (nanoparticles, nanocrystals or crystals embedded or encapsulated in the amorphous aluminophosphate matrix) or exist as uniformly-dispersed dopants within the glass matrix. In any of these forms, the additives, either individually or in conjunction with the aluminophosphate matrix can induce specific functionality useful for many applications. Such "mixed" aluminophosphate compositions can be formed as a powder or a coating or a fiber or as a bulk material. It is another object of the invention to develop films of the inventive compounds, compositions and/or materials with inclusions within the amorphous matrix material for inducing various functions including, but not limited to, optical, chemical, catalytic, physical, mechanical, and electrical properties. Such inclusions can be produced in-situ during the synthetic process and they may include metals, non-metals, and compounds of any combination of elements. One such example includes formation of carbon as nano-sized inclusions for providing high emissivity and enhances mechanical properties. High emissivity coatings that are durable at elevated temperatures are desirable for a number of applications where thermal protection is desired or such coatings provide energy savings through re-radiating incident heat fluxes in furnaces, ducts, boilers, heat exchangers, and the like.

It is an object of the present invention to provide a material having as a feature of its molecular structure, an O=P—O—Al—O—Al bonding sequence (with organic and other ligands as may be attached to P and Al) regardless of P/Al ratio and any additional metal therein to enhance coating properties or to create nanocrystals that induce or enhance chemical, physical, optical, electrical, mechanical, and thermal properties (nanocomposite coatings).

It is an object of the present invention to provide non-stick properties over a range of temperatures and environments; proven effective with enamel, alumina, and soda-lime glass substrates.

It is an object of the present invention to provide such a material to develop coatings from about 0.05 micron to about 10 microns (preferably about 100 nm, more preferably about 500 nm, most preferably about 1 micron); the coatings are dense, continuous, smooth, uniform, and transparent. The inventive compounds, compositions and/or materials and/or related coatings are hermetic; that is, without open porosity or pathway for fluid or gaseous ingression, and/or micro-structurally dense; that is, substantially non-porous and/or approaching zero pore volume. It is yet another object of the invention to develop thin films in the range of about 50 nm-about 10 microns that are transparent or opaque as desired for any application. It is yet another object of the invention to enable the use of these thin films for applications that require maintenance of strict design tolerances such that substrate geometry or features do not need to be modified to accommodate the thickness of the films deposited for protection or for other purposes of surface modification. With films of the inventive compounds, compositions and/or materials, as thin as about one micron or less, being sufficiently effective, no substrate modifications are necessary for most applications.

It is an object of the present invention to provide cured coatings using furnace or heat or infrared lamp or UV radiation (preferably @ 800 C, more preferably @ 600 C, and most preferably @ 500 C); UV radiation along with heat may cure the coating @ 250 C. It is a related object of the present invention to provide a curing process for excellent adhesion of the coating material.

It is an object of the present invention to provide coatings deposited using a dip or spray or flow or brush painting process. It is a further object of the invention to develop a process that utilizes a clear precursor solution that is stable (does not hydrolyze or decompose when exposed to ambient) and should enable versatile deposition processes including dip, spray, flow, and brush methods.

It is an object of the present invention to provide material coatings sufficiently smooth to impart a low-friction surface (friction coefficients below 0.1 have been measured). This allows for use of the material as a high temperature solid lubricant or as a wear resistant coating over a range of temperatures and environments; in this case, the inventive compounds, compositions and/or materials may serve as a multi-functional protective coating (nanocrystals within the material coating can be added to improve wear resistance or tailor thermal properties). It is yet another object of the invention to reduce the surface roughness of said substrates which is desired for many applications. The smooth nature of the films of the inventive compounds, compositions and/or materials deposited allows for planarization of most substrates. This will help in enhancing the non-wetting or non-stick nature of surfaces and also induces a low-friction surface with the added benefit of a lower surface energy attributed to the stable amorphous oxide surface on a substrate.

It is an object of the present invention to provide protective coatings for molten material processing; the amorphous, dense, and non-stick nature of the present material is highly suitable for providing a non-stick surface. The present invention protects against other molten materials as well as molten aluminum, including molten polymers, molten glass and other non-ferrous molten metals.

It is an object of the present invention to provide a dielectric layer to certain glass and ceramic substrates. In some cases, both dielectric properties and corrosion resistance is desired. The inventive compounds, compositions and/or materials can serve as a suitable dielectric for a number of applications; the pin-hole free nature of the coating is very attractive for this purpose Coatings with suitably low dielectric constant are desired for example on SiC semiconductors or highly electrically insulating layers are desirable on glass substrates for solar cell applications. It is an objective of the invention that such coatings can be deposited on substrates including, but not limited to, glass, metal, alloy, ceramic, and polymers/plastics. It is a further objective of the invention to develop coating materials that are highly stable and possess low oxygen diffusivity such that ultra-thin films of the material will provide adequate protection to substrates. This will be a significant advantage over prior art coating materials where thick, non-hermetic coatings are used which crack or spall-off during thermal cycling causing catastrophic failure of the part during use. This is especially a concern in aerospace and energy applications where extremely high temperatures are used. It is yet another objective of the invention to allow the use of such coatings over a range of temperatures (cryogenic low temperatures to above about 1400 C) in a broad range of benign to harsh environments. It is yet a further objective of the invention to utilize the low surface energy of the aluminophosphate material advantageously in applications where non-wetting or non-stick properties are desired. These may include, but not limited to, non-wetting against water, solvents, chemicals, solids, molten salts, molten metal, and atmospheric contaminants (including organic matter).

It is yet another objective of the invention to enable self-absorption of organic on the surface of the films of the inventive compounds, compositions and/or materials deposited on substrates. Due to the presence of certain organic contaminants in the atmosphere, surfaces of the inventive compounds, compositions and/or materials reacts with such organic materials, under ambient conditions, forming a stable bond with the organic material or its modified form via a self-absorption process. Such organic films further lower the surface energy of the composite structure, thus providing a hydrophobic or non-wetting surface. Organic films can also be deposited over the film of the inventive compounds, compositions and/or materials including, but not limited to, oleic acid and organo-silanes, using simple dip-coating process. The organic layer present is characterized by observation of an organic group on the surface using Fourier transform infra-red spectroscopy (absorption bands at 2994, 2935, 1702, 1396, 1337 and 972 $cm^{-1}$ are observed which is attributed to an organic group attached to the surface of the inventive compounds, compositions and/or materials).

It is a further object of the invention to provide amorphous and thermally stable coatings on optical materials to enable ease of polishing or finishing of optical surfaces. Such components include lenses, mirrors, radomes, and other optical materials that comprise of glasses, single- and poly-crystalline ceramic materials. A planarizing effect can be induced by deposition of coating, thus effectively reducing the surface roughness of the substrate materials.

It is a further object of the invention to provide a coating on glass to prevent sodium diffusion during application of overlayers for inducing functional properties such as low emissivity coatings and the like. Another object of the invention is to provide a seal on microdefects or flaws present on the surface of a glass or a ceramic object such that improved mechanical strength is realized from the application of the inventive coating material.

It is a further object of the invention to provide oxidation protection to SiC and other ceramic materials that are subject to oxidation at elevated temperatures. It is a still further object of the invention to provide a thermally stable dielectric layer on SiC semiconductor devices.

Other objects, features, benefits, and advantages of the present invention will be apparent from the preceding, the summary of this invention, and the following descriptions of various embodiments thereof, and will be readily apparent to those skilled in the art having knowledge of various coatings, protected substrates and/or composites. Such objects, features, benefits, and advantages will be apparent form the above as taken into conjunction with the accompanying examples, data, figures and all reasonable inferences to be drawn therefrom, alone or with consideration of the references incorporated herein.

SUMMARY OF THE INVENTION

It was surprisingly found that a microstructurally dense amorphous aluminophosphate material can be prepared using a low-cost precursor of phosphorous pentoxide and hydrated aluminum nitrate, in ethanol or other fluid media. Pyrolysis of the precursor at temperatures above 500 C yields a stable microstructurally dense amorphous aluminophosphate material which is resistant to crystallization up to 1400 C. See, for instance, U.S. Pat. No. 6,036,762, incorporated herein in its entirety. Other aspects relating to the range of suitable precursors or solutions thereof are provided in copending application Ser. Nos. 10/362,869 and 10/627,194 filed Feb. 21, 2003 and Jul. 24, 2003, respectfully—each of which is also incorporated herein by reference in its entirety.

More importantly, it was surprisingly found that the coating surface enables strong bonding with a variety of organic materials that either come in contact with the coating surface in gaseous or liquid or in solid form. Without being bound to any theory, it is suspected that the coating surface contains Al—O and P—O bonds which preferentially hydroxylate and thus enable strong absorption of organic matter. Such bonded surfaces are very robust and the organic material remains bonded even to elevated temperatures and are stable against many chemical treatments.

Surfaces bonded with such organic materials can provide many useful properties, including but not limited to, easy-to clean or self-cleaning surfaces due to the hydrophobic nature of the organic material. As an alternative, the chemistry of the organic can be selected to impart a hydrophilic surface to improve bonding with many materials including polymers or plastics or other suitable materials.

It was also surprisingly found that the inventive coating material provides excellent protection against oxidation to non-oxide ceramic material, such as silicon carbide (SiC), at elevated temperatures. Unique bonding of the inventive coating material with oxidation product of the SiC surface is apparent from spectroscopic examination and the surface of the coated ceramic material after exposure to 1400 C in air shows a substantial improvement in surface morphology with a glossy appearance as opposed to relatively dull appearance for the uncoated material. Such treatments can provide enhanced oxidation protection to SiC fibers, monoliths, and composites, provide a non-wetting or non-stick surface that may enhance toughness of the material made in composite form.

Upon depositing the coating of the inventive material on a porous ceramic (such as a tile or porous enamel material), it was surprisingly found that the coating provides an excellent seal on pores of the ceramic substrate material. This will provide substantial benefit in preventing dirt or contaminant collecting in the pores during service. However, since the coating can be made to be sufficiently thin, the overall surface morphology is not adversely affected. This may be beneficial in certain applications, where the rough surface is desired to impart certain frictional properties (such as in floor tiles for anti-slip), but the pores are sufficiently covered by the substantially pore-free nature of the coating of the inventive material. This will help maintain a clean surface over extended time periods and will enable lower costs and labor for maintenance. Embodiments of the inventive aluminophosphate compounds, compositions and/or materials of this invention are available under the Cerablak trademark from Applied Thin Films, Inc. Various considerations relating to this invention are disclosed in U.S. Pat. Nos. 6,036,762 and 6,461,415 and pending patent application Ser. Nos. 10/266, 832 and PCT/US01/41790, each of which are incorporated herein in its entirety.

The material tends to form over a wide range of aluminophosphate compositions and stoichiometries such that a particular Al/P ratio can be selected to suit the needs for a specific application. Al-rich compositions are more thermally stable in the amorphous form. Stoichiometric or P-rich compositions also yield a dense material, but the thermal stability is limited. However, they may be useful in applications where the temperature limit do not exceed 1000 C.

Most surprisingly, it was found that the material has very low oxygen diffusivity such that it can serve as an excellent protective coating on substrates susceptible to high temperature oxidation. Because of this unique property, to serve as a protective hermetic coating, it is sufficient to deposit an ultra-thin dense film of the material at a thickness of about 0.1 micron, more preferably at a thickness of about 0.5 microns, and most preferably a thickness of about 1 micron. Such thin coatings are not prone to cracking and delamination due to thermal expansion mismatch between coating and substrate. The low-cost of the precursor material and deposition process also allows for its deposition as an overcoat or undercoat on conventional coatings utilized in glass and ceramic industries which are well known to those skilled in the art.

Accordingly, from a broader perspective, the present invention includes in a composite comprising a substrate such as a glass or a ceramic and a substantially amorphous and substantially non-porous aluminophosphate film. Such a composite can further comprise a component comprising a phosphate group and bonded interaction with such a substrate. Regardless, such a composite can optionally comprise an organic component on the aluminophosphate film. Without limitation, the aluminophosphate film can comprise an aluminum content about, less than, or greater than stoichiometric on a molar basis relative to the phosphorous content of the film.

In certain embodiments, the film of such a composite can further comprise a component including but not limited to carbon, a metal and a metal compound. In certain other embodiments, such a component is a nanoparticle. Without limitation, metal and/or metal compound nanoparticles include those described herein, but can also be selected from those materials described in the aforementioned incorporated patents and patent applications. Regardless, in certain embodiments, the substrate can comprise a ceramic tile, alumina, porcelain enamel, mullite, silicon nitride, silicon carbide, and combinations thereof. Alternatively, where the substrate is a glass, such a material can be selected from soda-lime glasses, borosilicate glasses, aluminosilicate glasses and pyrex. Likewise, regardless of nanoparticulate inclusion or substrate identity, the aluminophosphate film of such a composite can have a thickness dimension of about 0.05 micron to about 10 microns. In various other embodiments, such a film can be dimensioned from about 0.1 micron to about 1.0 microns. As described elsewhere herein, depending upon thickness and/or formulation, such a film can be transparent or opaque, as may be needed for a desired end-use application.

As mentioned above, certain embodiments of the composites of this inventions can, optionally, include an organic component on the aluminophosphate film. As evidenced herein and described in the following examples, such a component can be chemically bonded to the aluminophosphate film. In certain embodiments, such a component can be applied as a film to the aluminophosphate film; in various other embodiments, an organic component can be absorbed from a gaseous phase, such as the atmosphere under ambient conditions. As described elsewhere herein, a certain degree of composite hydrophobicity is provided by incorporation of an aluminophosphate compound or material of this invention. Enhanced hydrophobicity can be achieved with such a composite further comprising an organic component on the aluminophosphate film, regardless of source, identity or mode of application.

As mentioned above, composites of this invention can comprise nanoparticulate carbon. Such inclusions can enhance emissivity and associated mechanical properties, especially so when such an aluminophosphate film is provided as part of a ceramic composite. Alternatively, an aluminophosphate film comprising a metal component dopant, in sufficient amount, exhibits an enhanced refractive index. Such benefits are available through inclusion in one aluminophosphate film or, alternatively, in a second film between the first film and the substrate. Regardless and without limitation, such a metal component dopant can be selected from titanium, zirconium and lanthanum.

In part, the present invention can also include a method of using an aluminophosphate compound, composition and/or material of this invention to lower the surface energy of a composite substrate. Such a method comprises (1) providing a precursor to an aluminophosphate compound, the precursor comprising an aluminum salt and a phosphate ester in a fluid medium; (2) applying the medium to a substrate; (3) heating the applied medium for a time and at a temperature sufficient to provide a substantially amorphous and substantially non-porous aluminophosphate compound on the substrate; and (4) applying an organic component to the aluminophosphate compound. The aforementioned medium can be applied to the substrate through a variety of means as would be understood by those skilled in the art, such application including but not limited to dip-coating, spinning and spraying. In such embodiments, the organic component can be provided as a film on the aluminophosphate compound. Alternatively, as described elsewhere herein, an organic component having the effect to lower substrate surface energy can be absorbed from a gaseous phase, including ambient atmosphere.

In part, the present invention can also include a substrate and an aluminophosphate film of the type described herein, with the film having a planarization and/or a sealant effect on the substrate. Planarization effects are as elsewhere described herein, but can without limitation be considered in the context of a decrease in substrate surface roughness. In certain other embodiments, planarization can be considered by at least a 20% decrease in original root mean square value as may be realized through use of either one or more films or depositions.

In part, the present invention can also include a composite comprising a glass substrate, a film of an aluminophosphate compound and/or material of this invention, and at least one additional component on the film comprising at least one of a transparent conducting oxide, an ultra-violet light absorbing component, an infra-red light absorbing component and an infra-red light reflecting component. In certain embodiments, such an additional component can comprise indium tin oxide. Regardless, such substrates can be selected from soda-lime glasses, borosilicate glasses, aluminosilicate glasses and pyrex.

For the purposes of the present compounds, compositions, materials and/or methods, the following expression(s) and word(s), unless otherwise indicated, will be understood as having the meanings ascribed thereto by those skilled in the art or as otherwise indicated with respect thereto:

"Aluminophosphate" means a compound, composition and/or material comprising aluminum and phosphate. Without limitation, such a compound, composition and/or material can be represented with a formula $AlPO_4$, wherein the aluminum and phosphate components thereof can vary over the range of stoichiometric relationships known to those skilled in the art made aware of this invention.

"On" means, in conjunction with a compound, composition and/or material coating or film of this invention the position or placement of such a compound, composition and/or material coating or film in relation to a corresponding substrate, notwithstanding one or more layers, components, films and/or coatings there between.

Accordingly, this invention may be applied with particular advantage to glass and ceramic substrates comprising soda-lime glass, porcelain enamel, ceramic tiles and refractories, advanced ceramics such as SiC or silicon nitride, ceramic fibers and composites, although the scope of application of the present invention is not restricted to these materials. Among the glasses and ceramics which may particularly profit from the present invention, mention may be made in particular of soda-lime glasses, pyrex, ceramic tiles, alumina, porcelain enamel, SiC and silicon nitride.

Without limitation, specific fields of application and examples of the use of the present invention include the following:

Protection of SiC and other non-oxide ceramics from oxidation, protection of carbon from oxidation, coating of enamel, porcelain, or other ceramic bodies for protection against molten aluminum or other non-ferrous molten metal, transparent coatings on glass or ceramic articles, low dielectric constant coatings and bodies, high strength matrices for ceramic matrix composites, interface coatings for ceramic matrix composites, sealing of pores in ceramic bodies to provide an easy-to-clean surface for floor tiles wall surfaces and others, transparent coatings on glass, high emissivity coatings, scratch resistant coatings, hydrophobic coatings, etc.

DETAILED DESCRIPTION OF CERTAIN EMBODIMENTS OF THE INVENTION

The inventive compounds, compositions and/or materials is a sol-gel derived amorphous aluminum phosphate-based material. The inventive compounds, compositions and/or materials can be synthesized over a wide range of aluminum to phosphorous ratios, including from about 1/1 to about 10/1. The inventive compounds, compositions and/or materials is highly inert to chemical attack, thermally stable beyond 1400° C., and is sufficiently transmissive to light in the visible, IR, and UV ranges (200-6000 nm). High temperature oxidation tests have shown that the inventive compounds, compositions and/or materials is also highly impervious to oxygen ingress.

The inventive compounds, compositions and/or materials can be deposited as a dense, pinhole-free thin coating on substrates using a simple dip, paint, spray, flow or spin coating process at relatively low temperatures (500° C. or above) (FIG. 1. It has excellent potential to be scaled up without significant capital investment to produce continuous coatings on a variety of substrates. As a highly covalent inorganic oxide, the inventive compounds, compositions and/or materials is chemically inert (like alumina) and thermally stable material. The inventive compounds, compositions and/or materials is a unique metastable amorphous material stable to temperatures beyond 1200° C. Testing of The inventive compounds, compositions and/or materials has demonstrated the electrical insulating property of the film and the continuity, hermiticity and, protective nature of the coating.

The species present in a precursor solution of inventive compounds, compositions and/or materials can be used to derive the properties of the solid inventive compounds, compositions and/or materials. Based on the collective experimental evidence, we believe the principal ingredients of the precursor solution comprise of complexes that contain Al—O—Al linkages. This inference is primarily based on identification of Al—O—Al linkages in precursor solutions, dried gels, and calcined powders. $^{31}$P nuclear magnetic resonance (NMR) spectra of the precursor solutions show at least one of two prominent peaks near −5 ppm and −12 ppm, which is assigned to aluminophosphate complexes (1) and (2) respectively, with a mixture of alcohol and water molecules coordinated to aluminum (FIG. 2). Further $^{31}$PNMR analysis of the precursor solution shows predominantly the presence of two phosphate esters bonded to one or two aluminum atoms. The reactivity of these complexes are sterically restricted by the P═O groups and hydrolytically stable P—OR groups (See for reference, Sol-gel synthesis of phosphates, J. Livage et al., Journal of Non-Crystalline Solids, 147&148, 18-23 (1992)). Not bound by any theory, the stability of the complexes can restrict the condensation of these complexes (decreases the kinetics of condensation) forming an extended three dimensional Al—O—P network. Accordingly, the shelf-lives of precursor solution are extended and the solutions remain clear for several months to years. Further, the alcohol-based solvent offers excellent film forming ability while the base phosphate chemistry allows for chemical bonding with most substrates resulting in strong adhesion.

These results support the formation of multi-cation clusters with Al/P ratio ≧2 in solution leading to [O═══P—O—Al—O—Al] cluster formation. Thus both requirements of a) P═O and b) Al—O—Al to be part of a cluster unit seem to be important. This trend is consistently observed with a number of other synthetic routes for producing the inventive compounds, compositions and/or materials. The species common to all solutions that yield inventive compounds, compositions and/or materials are those consisting of at least [O═══P—O—Al—O—Al] links. FIG. 3 shows FTIR of dried powder at 150° C. and calcined at 1200° C. products, respectively. It is clear from FTIR data that at 150° C., both P═O and Al—O—Al species are observed. The observation of the P═O stretching at a much higher frequency (1380 cm$^{-1}$) indicates that the terminal oxygen atom in P═O bond is uncoordinated.

Studying the evolution of the inventive compounds, compositions and/or materials from the gel state also provides interesting insights. Upon pyrolysis, cross-linking of [O═══P—O—Al—O—Al] moieties continue over a range of temperatures eventually resulting in a "[—PO$_4$—AlO$_4$—AlO$_6$—AlO$_4$—PO$_4$—]" fragment in the high-temperature amorphous framework. The presence of this type of linkage in the calcined material is established from combined data of NMR and FTIR spectroscopy. The inventive compounds, compositions and/or materials contains tetrahedral coordination for aluminum, along with "distorted" octahedral aluminum, the intensity of which increases with excess aluminum content. This is unlike the exclusive tetrahedral coordination for aluminum observed in all crystalline polymorphs of AlPO$_4$. The $^{27}$Al NMR data suggests a distorted environment for the tetrahedral Al, whereas the corresponding $^{31}$P NMR shows an undistorted environment for [PO$_4$] groups. Combining these two data we conclude that [PO$_4$] groups are linked only to [AlO$_4$] groups which in turn are linked to [AlO$_6$] groups. Correspondingly, Al—O—Al bending mode vibrations at 825 cm$^{-1}$ in the FTIR spectra, the intensity of which also scales proportionally with excess aluminum content, suggests a direct linkage between [AlO$_6$] and [AlO$_4$] polyhedra.

The multicluster P—O—Al complexes identified above represent a new way for synthesis of amorphous oxide materials. Besides the precursor system used in this specific case (aluminum nitrate and phosphorous pentoxide in alcohol), essentially any precursor system that yields complexes with P═O and Al—O—Al moieties (which are linked with each other) will yield the inventive compounds, compositions and/or materials. Regardless of the precursor system used, the formation of these complexes appear to yield the inventive compounds, compositions and/or materials. Such complexes may be further modified with other additions (silicon, zirconium, lanthanum, titanium) which can potentially enhance the amorphous characteristics or enhance the thermal stability of these materials.

Although many coating techniques can be used with the precursor solution, dip-coating, spraying painting and flow coating are most often used. All are low-cost, easy to apply and scale up. successfully on various substrates, including metals, alloys, glass, ceramics and others. The inventive compounds, compositions and/or materials solutions show good wetting properties and is particularly significant when alcohol (preferably ethanol, but other alcohols including, but not limited to, methanol, isopropanol, butanol, hexanol and other higher molecular weight alcohols can be used as well) is used as the solvent, although good wetting properties can be attained even using aqueous solutions. Many oxidation studies have proven the hermiticity of the coating and the advantage of thin inventive compounds, compositions and/or materials films. Coatings on stainless steel coupons can withstand treatments of 1000 C or more without cracking.

The coating composition employed according to the present invention may be applied onto the glass and ceramic surface according to conventional coating methods. Examples of techniques which may be employed are dipping, spinning, spraying or brushing. Particularly preferred are dipping and spraying processes.

The inventive compounds, compositions and/or materials solution has been applied with a variety of methods and compositions. The inventive compounds, compositions and/or materials has been coated onto a wide variety of substrates, including float glass, fused silica, alumina, mullite, sapphire, silicon carbide, carbon, borosilicate glass, enamel, porcelain, aluminum titanate, various types of ceramic composites, ceramic aggregates, ceramic tiles, conventional and advanced ceramic refractories, and others. After application of the coating, it is dried to remove solvent and cured to remove the organics and nitrates (or other salt components from the precursor). The coating can be cured in the furnace or with a portable hot airgun or infrared heat lamp. The coatings cure quickly and are stable.

Many of the aforementioned ceramic substrate materials are currently being used in a broad range of industrial and consumer applications in diverse environments. For most of these applications, the surfaces of these substrate materials are relatively rough and they contain relatively high levels of porosity. The pores in the bulk are helpful in imparting toughness to the ceramic material, however, they also serve as channels for diffusion of gases and other liquids which cause material degradation, especially in harsh environments and at elevated temperatures. Thus, a seal coat layer which can be applied using a low-cost and versatile coating process and is thermally stable and can provide protection against corrosion or oxidation will be beneficial. Coating of the Inventive material has many attractive attributes to fulfill this need.

In addition, for many applications, decreasing surface roughness may be important. As demonstrated in Examples 18 and 27, the coatings of the Inventive material provides a substantial benefit in decreasing surface roughness and in sealing pores. In addition, its relatively lower surface energy provides further benefit in maintaining a relatively cleaner surface due to its superior repellant properties. For certain applications, the surface energy can be further lowered by applying suitable organic layers as described in the Examples provided herein.

During the curing process, bonding with substrate materials is promoted. In many cases, the precursor solution may enable direct phosphate bonding with substrates which also helps in improving adhesion. Thus the use of curing temperatures above 500 C in oxidizing environment or ambient air is favorable for obtaining fully cured coatings as well as attaining good adhesion with substrates. Those skilled in the art will recognize that the temperatures, environments, and time of exposure can be adjusted over a wide range to accomplish the various objectives discussed above. Use of higher temperatures and higher partial pressure of oxygen in the ambient is preferred for fast curing suitable for many applications which will also reduce processing cost.

Slurries have also been made by dispersing a powder in the inventive compounds, compositions and/or materials solution. Slurry coatings were made to increase the thickness or functionality of the coating. Different powders were mixed into the inventive compounds, compositions and/or materials solution. Slurry coatings can be applied by any of the above coating methods. When synthesized as a powder, the inventive compounds, compositions and/or materials contain nanoinclusions of glassy carbon completely embedded in the amorphous material. These carbon inclusions help to provide high emissivity characteristics to the powder. High emissivity coatings can be made by making a coating from using a slurry of black inventive compounds, compositions and/or materials particles dispersed in inventive compounds, compositions and/or materials solution. The inventive compounds, compositions and/or materials may also be used as a protective binder for pigments. It is also possible to synthesize the inventive compounds, compositions and/or materials without carbon inclusions with appropriate selection of precursor formulations.

The low-cost associated with the inventive compounds, compositions and/or materials coating technology allows for combined options to be considered. It is expected that the inventive compounds, compositions and/or materials can enhance the oxidation resistance behavior of a wide range of non-oxide ceramic materials.

Thin films with low dielectric constant are useful for semiconductor applications, especially for next generation of semiconductor devices that utilize SiC-based semiconductor materials. SiC-based microprocessors are intended for use at elevated temperatures, where conventional silicon-based semiconductor devices cannot operate due to the harsh chemical and thermal environments. However, new dielectric layers are needed for SiC that exhibit suitable electrical properties as well as be thermally stable and protect the underlying SiC from oxidation or corrosion and also serve as a good diffusion barrier. The dielectric constant of the inventive compounds, compositions and/or materials ranges from 3.3-5.6. With the hermetic quality of the films of the inventive material and the low oxygen diffusivity, it can serve both as a protective and dielectric layer.

Transmission to light is important for many applications. FIG. 9 shows a glass microscope slide coated with the inventive compounds, compositions and/or materials and an uncoated slide. The inventive compounds, compositions and/or materials has been shown to be transmissive to radiation between about 250-about 6000 nm. A coating of the inventive compounds, compositions and/or materials was deposited on a sapphire plate, and the transmission properties were compared to an uncoated sapphire piece. FIG. 10 shows the transmission of the coated vs. uncoated sapphire plates.

At high temperatures, the inventive material may react with the ceramic or glass substrate or induce a reaction with the environment. Such reactions may generate useful reaction products that can be used to exploit many other functional properties.

During the curing process, bonding with substrate materials is promoted. In many cases, the precursor solution may enable direct phosphate bonding with substrates which also helps in improving adhesion. Thus the use of curing temperatures above 500 C in oxidizing environment or ambient air is favorable for obtaining fully cured coatings as well as attaining good adhesion with substrates. Those skilled in the art will recognize that the temperatures, environments, and time of exposure can be adjusted over a wide range to accomplish the various objectives discussed above. Use of higher temperatures and higher partial pressure of oxygen in the ambient is preferred for fast curing suitable for many applications which will also reduce processing cost.

The low-cost associated with the inventive compounds, compositions and/or materials coating technology allows for combined options to be considered. It is expected that the inventive compounds, compositions and/or materials can enhance the oxidation resistance behavior of a wide range of non-oxide ceramic materials.

Thin films with low dielectric constant are useful for semiconductor applications, especially for next generation of semiconductor devices that utilize SiC-based semiconductor materials. SiC-based microprocessors are intended for use at elevated temperatures, where conventional silicon-based semiconductor devices cannot operate due to the harsh chemical and thermal environments. However, new dielectric layers are needed for SiC that exhibit suitable electrical properties as well as be thermally stable and protect the underlying SiC from oxidation or corrosion and also serve as a good diffusion barrier. The dielectric constant of the inventive compounds, compositions and/or materials ranges from 3.3-5.6. With the hermetic quality of the films of the inventive material and the low oxygen diffusivity, it can serve both as a protective and dielectric layer.

At high temperatures, the inventive material may react with the substrate or induce a reaction with the environment. This reaction product may have additional useful properties.

Although the oxide form of the inventive aluminophosphate compound and/or material is suitable for good adhesion with most ceramic oxides and oxide glasses, the phosphate component of the Inventive material will be useful for bonding to non-oxide ceramic substrate materials (such as silicon carbide or silicon nitride or C/SiC materials) and will also help improve adhesion to oxide materials. Without being bound to any theory, it is proposed that the adhesion is primarily promoted by phosphate bonding between the constituents in the precursor solution and the glass or ceramic substrate. Phosphate bonding is well known in the art for bonding ceramic-to-ceramic or ceramic-to-glass or glass-to-glass materials, including bonding in ceramic composite materials, such as zirconium phosphate-bonded silicon nitride materials used in radomes.

The higher curing temperatures utilized in the present invention (above 500 C) helps in promoting the adhesion. The phosphorous contained in the precursor, at least partially, bonds with the oxide via a phosphate link, which enables good adhesion between the substrate and the deposited film after curing. As the precursor is decomposed in ambient air at these elevated temperatures, phosphate groups present in the precursor solution form phosphate bonds with substrate materials. For example, FTIR and Raman spectroscopic analysis performed on glass coated with the inventive material show absorption corresponding to bonds that cannot be assigned to either the inventive compounds, compositions and/or materials or the substrate. It is believed that Si—O—P bonds are formed at the interface during the curing process that helps in achieving the excellent adhesion observed. Thus the final architecture of the coated material can be defined to contain component between the substrate and the aluminophosphate an additional interface or adhesive layer, which may comprise of a continuous phosphate-bonded layer, linked to phosphate groups of the film, or mixtures thereof. Thus, the benefits of utilizing the said precursor system along with a suitable curing process yields a well-adherent glassy film.

Thus the use of curing temperatures above 500 C in oxidizing environment or ambient air is favorable for obtaining fully cured coatings as well as attaining good adhesion with substrates. Although lower curing temperatures can be used to cure the coatings by exposing for longer periods of time, temperatures in excess of 500 C is preferred to promote direct bonding via phosphate groups with substrate constituents. Those skilled in the art will recognize that the temperatures, environments, and time of exposure can be adjusted over a wide range to accomplish the various objectives discussed above. Use of higher temperatures and higher partial pressure of oxygen in the ambient is preferred for fast curing suitable for many applications which will also reduce processing cost. The adhesion with substrates can be further improved with altering the Al/P ratio according to the substrate composition. Thus the inventive aluminophosphate material can also be used as a bonding agent for bonding ceramic and glass, or their combination, in monolithic or composite forms. In addition, the surface of the inventive material is also suitable to bond with polymers that may needed to be bonded to glass or ceramic for a given application.

EXAMPLES OF THE INVENTION

Example 1

794 g of P2O5 is dissolved in 2.4 liters of ethanol and stirred for several hours. 1800 g of Al(NO3)3.9H2O dissolved in 3 liters of ethanol by stirring. 61 mL of phosphorous solution and 501 mL of aluminum solution are mixed. This solution is refluxed for time sufficient to promote the formation of complex esters containing Al—O—P groups. This solution can be further diluted with organic solvents as necessary for coating application.

Example 2

The 50 ml of precursor solution prepared in example 1 is dried by evaporating solvent at 150° C. in an oven. Thermogravimetric analysis of this dry powder is performed. The TGA data in FIG. 4 shows about 47% weight loss due to organics and there is no appreciable weight loss above 350° C. indicating that nearly all of the organics and nitrates are no longer present in the material.

Example 3

Precleaned soda glass plain microscope slides (3×1×1 mm) are ultrasonicated in acetone and methanol for 5 min each. Then the slides are dried in nitrogen. These slides are dipped in solution prepared in example 1. After retracting slowly from the coating solution, dried with heat gun and cured at 550° C. for 0.2 hours.

Example 4

The inventive material coated slides prepared in the example 3 are exposed to ambient atmosphere for various amount of time at a relative humidity >60% for air-borne organic molecules adsorption. Static contact angles for water of these ambient exposed slides are measured as follows. Small drops of deionized water from a micropipette are placed on the coated glass surface. Photograph of the droplet is taken and angles on both sides of drops with perpendicular to the sample surface were measured. Inventive material coated sodalime glass slides showed contact angles with water in the range 70-105 deg after 10 days of exposure of ambient. In comparison, uncoated glass slides show only around 35 deg after several days of ambient exposure.

Example 5

The organic layer bonded slides prepared in example 3 are rubbed with acetic acid soaked wipers., then dried in nitrogen. Contact angle is remains the same as before the acetic acid treatment.

Example 6

Stability of hydrophobicity of the coated slides with temperature are studied by following contact angle for water after various heat treatment of the slides. Following table shows the contact angle values of various slides. It is evident from the contact angle values the organic layer bonded to coated surface is stable up to 200° C. Heat treating the slides over 300° C., removes much of the organic layer and the contact angles are decreased.

Air-Borne Organic Adsorption

|  | After 20 min heat treatment | | | |
| --- | --- | --- | --- | --- |
| Slide | 25° C. | 200° C. | 300° C. | 400° C. |
| Inventive material coated | 69/70 | 62/63 | 34/34 | 12/10 |
| Inventive material coated | 64/64 | 57/56 | 37/36 | 14/16 |
| Inventive material coated | 87/87 | 57/56 | 38/35 | 16/12 |
| Inventive material coated | 64/64 | 66/65 | 39/40 | 10/5 |
| Inventive material coated | 91/92 | 84/84 | 52/52 | 14/11 |
| Uncoated | 37/35 | 42/39 | 20/21 | 22/20 |

Example 7

Fourier transform infrared spectrum of inventive material coated glass slides in Example 4 that was exposed to ambient atmosphere is recorded. FIG. 5 clearly shows the presence of $CH_2$ and $CH_3$ groups confirming that the hydrophobicity results from the organic molecular bonding to the coated surface.

Example 8

Slides prepared in example 2 are cleaned by ultrasonicating in acetone and methanol. After drying with nitrogen the slides are dipped in 0.01 N hydrochloric acid for 20 min. Then washed with water and dried in nitrogen. Then dipped in 0.005M Oleic acid in hexane and retracted slowly after few minutes. Dried with nitrogen. Contact angles for water showed around 90 deg showing the formation of self assembled monolayers of oleic acid on inventive material surface. Other fatty acids or organic molecules with functional groups that can bond to the surface produce the same effect.

Example 9

Coated glass slides prepared in example 2 are cleaned by sonicating in acetone and methanol. After drying with nitrogen the slides are dipped in 0.01 N hydrochloric acid for 20 min, then washed with water and dried in nitrogen. The coated slides are then dipped in 0.005M Oleic acid in ethanol and kept at 60° C. for 2 hours. Then the slides are removed and dried with nitrogen. Contact angles for water were around 75 deg.

Example 10

Attenuated Total Reflectance (ATR) spectra of Oleic acid monolayer coated samples from Example 8 are recorded to determine the bonding character of oleic acid molecules with inventive material surface. The location for the band at 1540 $cm^{-1}$, as seen in FIG. 6, indicate the formation of COO—Al bonds of aluminum-carboxylate complexes. (Ref: FTIR spectral characterization of thin film coatings of oleic acid on glasses D. H. Lee, R. A. Condrate SR., W. C. Lacourse, Journal of materials science, vol 35, 4961-4970 (2000)).

Example 11

The oleic acid coated slides prepared in example 8 are heated at various temperatures to estimate their hydrophobic stability with temperature. Following table gives the contact angle values after heat treatment. The hydrophobic property is high up to 155° C. On heating further at 200° C. for 20 minutes contact angle drops to 30 deg indicating the removal of oleic acid.

| Treatment conditions | Sample 1 | Sample 2 |
| --- | --- | --- |
| 110 C., 20 min | 69 | 75 |
| 140 C., 20 min | 71 | 65 |
| 155 C., 20 min | 64 | 72 |

Example 12

Slides prepared in example 2 are cleaned by ultrasonicating in acetone and methanol. After drying with nitrogen the slides are dipped in 0.01 N hydrochloric acid for 20 min. Then washed with water and dried in nitrogen. Then dipped in 0.005M Oleic acid in nitromethane and kept at 60° C. for 2 hours. Then the slides are removed and dried with nitrogen. Contact angles for water showed around 80 deg. The oleic acid coated slides are then heated at 110° C. and 155° C. for 20 min each. Following table gives the contact angle values after heat treatment. The hydrophobic property is retained above 155° C. On heating further at 200° C. for 20 minutes contact angle drops near 30 deg indicating the removal of oleic acid layer.

| TREATMENT CONDITIONS | Sample 1 | Sample 2 |
| --- | --- | --- |
| As prepared | 80/68 | 74 |
| 110 C., 20 min | 73/62 | 71/68 |
| 155 C., 20 min | 74/65 | 69/70 |

Example 13

Slides prepared in example 2 are cleaned by ultrasonicating in acetone and methanol. After drying with nitrogen the slides are dipped in 0.01 N hydrochloric acid for 20 min. Then washed with water and dried in nitrogen. Then dipped in 0.4 wt % of octadecyl trichloro silane in hexadecane/chloroform (70:30) mixture. Then the slides are removed after 30 min. Then cleaned with toluene and dried with nitrogen. Then the slides are cured at 100° C. in a vacuum oven for 2-24 hours. Contact angles for water showed greater than 90 deg. The slides are then heated at up to 200° C. in ambient atmosphere. Following table gives the contact angle values after heat treatment. The hydrophobic property is retained above 200° C. The photographs show water droplets on the organic layer coating slides (FIG. 7). On heating further at 250° C. in air contact angle drops near 30 deg indicating the removal of organic layer.

Example 14

Slides prepared in example 2 are cleaned by ultrasonicating in acetone and methanol. After drying with nitrogen the slides are dipped in 0.01 N hydrochloric acid for 20 min. Then washed with water and dried in nitrogen. Then dipped in a mixture containing 1.5 mL of octadecyl triethylsilane, 0.5 mL of an amine catalyst in 60 mL of toluene. Then the slides are removed after 12 hours, then cleaned with toluene and dried with nitrogen. Then the slides are cured at 100° C. in a vacuum oven for 2-24 hours. Contact angles for water showed greater than 90 deg.

Example 15

264 g of $Al(NO_3)_3 \cdot 9H_2O$ is dissolved in 300 mL ethanol. In a separate container, 25 g $P_2O_5$ (or other soluble phosphate ester) is dissolved in 100 mL ethanol which promotes the formation of phosphate esters and this solution is then added to the aluminum-containing solution. This solution refluxed for time sufficient to promote the formation of complex esters containing Al—O—P groups. This solution is clear and shelf-stable for years.

Example 16

A piece of sapphire is coated with the composition of Example 15. The coating is dried in flowing air and heat treated at 1000° C. for ½ hour to form the inorganic coating. The coated sample is as transparent as an uncoated piece.

Example 17

The sapphire samples of Example 16 were measured for transparency with a UV-Vis spectrometer. The coated sample was at least as transparent as the uncoated sample in the wavelength range 250-6000 nm (FIG. 8).

Example 18

A piece of unglazed ceramic floor tile was coated with the composition of Example 1. The sample is dried in flowing air and heat treated above 500° C. to remove the organics and nitrates and form a fully inorganic film. The coating has filled in the small pores and reduced the surface roughness on the microscale, while the large scale (>10 µm) surface roughness is unaffected, leaving the non-skid properties of the tile intact (FIG. 9).

Example 19

Refractive indices of the inventive material and titanium or lanthanum doped inventive material are measured as function of wavelength. FIG. 10 shows that the refractive index of the inventive material can be increased by suitable doping of heavier elements.

| Material | Thickness (nm) | Refractive Index (n) at wavelength 589 nm |
|---|---|---|
| Inventive Material (IM) | 142 | 1.51 |
| IM/20 mol % $La^{3+}$ | 111 | 1.56 |
| IM/50 mol % $La^{3+}$ | 103 | 1.66 |
| IM/50 mol % $Ti^{4+}$ | 89 | 1.68 |

Example 20

A thick coating was applied to a piece of SiC by dipping the piece several times in a diluted solution of the composition of Example 1. The sample was heat treated, along with an uncoated sample at 1400° C. for 10 hours. The weight of the uncoated sample increased by 0.31%, while the weight of the uncoated piece increased by only 0.06%.

Example 21

Compositions of several other Al/P ratios were made as in Example 1 by changing the relative amounts of $Al(NO_3)_3 \cdot 9H_2O$ and $P_2O_5$ used. These solutions were dried in a beaker at 150° C. for 1 hour and then heat treating the dried material at 1100° C. for 1 hour. Several of these compositions were also made into powders. The dielectric constant of these powders was measured. Table 3 shows the dielectric constant of these powders in a variety of bands.

TABLE 3

Dielectric measurements of Cerablak ™ powders in the C and X bands.

| Frequency (GHz) | Al/P ratio | | | | |
|---|---|---|---|---|---|
| | 0.75/1 | 1.1/1 | 1.25/1 | 1.5/1 | 10/1 |
| 4.00 | | 5.37 | 4.17 | | 5.54 |
| 7.55 | 4.40 | 5.87 | 5.08 | 3.29 | 5.04 |
| 8.06 | 4.34 | 6.02 | 5.11 | 3.07 | 5.38 |
| 10.93 | 4.18 | 5.96 | 5.08 | 2.98 | 5.32 |
| 13.01 | 4.48 | 6.35 | 5.29 | 4.04 | 5.39 |
| average | 4.35 | 5.91 | 4.95 | 3.34 | 5.33 |

Example 22

A piece of Nextel 720 alumina/mullite fabric was dipped several times in the composition of Example 1. The coated fabric was heat treated to 800° C. for ½ hour to form the inorganic material. The fabric was then further coated with amorphous aluminum oxide. The coated fabric was mounted in epoxy and cross-sectioned. Scanning electron microscopy showed that the alumina coating did not stick to the coating of the inventive material.

Example 23

The composition of Example 1 was dried at 150° C. and dissolved in water to make an aqueous solution. Submicron α-alumina was dispersed in this solution and used to form a matrix of for a ceramic matrix composite with Nextel 610 fibers. Tensile strengths of up to 90 ksi were demonstrated.

Example 24

A piece of silicon carbide matrix/carbon fiber composite is coated with the inventive material by dipping in the composition of Example 1 and drying with cool air and heating at 500° C. for a sufficient time to cure the film (remove the organics and nitrates). The surface of the coated specimen is significantly more planar than the uncoated sample.

Example 25

Carbon fabric was coated with the inventive material by dipping in the composition of Example 1 and drying with cool air and heating at 500° C. for a sufficient time to cure the film (remove the organics and nitrates). The fabric was heat treated, along with an uncoated sample, at 800° C. for 2 hours, and removed. The coated fabric showed a weight loss of 96% and retained the shape and the weave of the fabric. The coated fabric could be easily handled. The uncoated sample had oxidized completely away.

Example 26

The solution of Example 1 was modified via the addition of an organic component to enable development of thicker crack-free film. This composition was applied to a porous ceramic body by dip coating. Several coatings were applied to develop a thicker film. The inventive material sealed much of the porosity of the ceramic (FIG. 11).

Example 27

A piece of 1 m-finish silicon carbide sample was coated with the composition of Example 1. The sample is dried in flowing air and heat treated above 800° C. to remove the organics and nitrates and form a fully inorganic film. The uncoated SiC surface is was highly porous and relatively rough (FIG. 12). SEM image in FIG. 12 of SiC coated with inventive material demonstrate its ability to seal pores and defects.

Example 28

Deposition of the coating of inventive aluminophosphate compound/material on ceramic and glass substrates also results in excellent adhesion. Attenuated Total Reflectance (ATR) spectrum, via FTIR, of inventive material coated silicon carbide sample prepared in Example 27 is recorded using a horizontal attenuated total reflectance (HATR) 45° Germanium crystal plate accessory to determine the bonding character of interface between inventive material and silicon carbide (Hexoloy material from Carborundum, N.Y.) surface. The sample was placed over the Germanium HATR crystal and the infrared radiation is reflected multiple times before reaching detector. The spectrum is recorded in the range 600-4000 cm$^{-1}$ with a resolution of 4 cm$^{-1}$ and plotted in FIG. 13 in transmittance mode. The location for the band near 1203 cm$^{-1}$, as seen in FIG. 13, do not correspond to known frequencies related to either the SiC substrate, its oxidized product, or the aluminophosphate film of the inventive material, thus providing evidence for an interfacial component present between the substrate and deposited film.

We claim:

1. A composite comprising a glass, a ceramic, or a glass-ceramic combination substrate and a substantially amorphous and substantially non-porous aluminum phosphate coating on the substrate in which an organic compound layer is chemically bonded onto the aluminum phosphate coating.

2. A composite of claim 1 in which the aluminum phosphate coating is formed by heating a complex formed by mixing alcoholic solutions of phosphate ester and aluminum salt.

3. A composite of claim 2 in which the complex formed by mixing alcoholic solutions of phosphate ester and aluminum salt does not contain halogen.

4. A composite of claim 1 in which the aluminum phosphate coating is formed by heating an alcoholic solution of phosphorus pentoxide and an aluminum salt.

5. A composite of claim 1 in which the aluminum salt does not contain halogen.

6. A composite of claim 1 in which the aluminum salt is aluminum nitrate.

7. A composite of claim 1 in which the coating is at least 80% transparent at wavelengths of about 250 to about 800 nm.

8. A composite of claim 1 which is hydrophobic.

9. A composite of claim 8 having a contact angle with water of at least fifty degrees.

10. A composite of claim 1 in which the organic compound is a fatty acid or an organosilane.

11. A composite of claim 1 in which the organic compound is absorbed from the atmosphere.

12. A composite of claim 1 in which the substrate is a ceramic, tile, alumina, porcelain enamel, mullite, silicon nitride, silicon carbide, or combinations thereof.

13. A composite of claim 12 in which the substrate is a ceramic.

14. A composite of claim 12 in which the substrate is a non-oxide ceramic.

15. A composite of claim 12 in which the substrate is silicon carbide.

16. A composite of claim 12 in which the substrate is a ceramic tile.

17. A composite of claim 1 in which the substrate is a glass.

18. A composite of claim 17 in which the substrate is a soda-lime glass, borosilicate glass, or aluminosilicate glass.

19. A composite of claim 1 in which the coating is less than 10 microns thick.

20. A composite of claim 1 in which the coating is 0.05 to 1 micron thick.

21. A composite of claim 1 in which the coating is a high emissivity coating.

22. A composite of claim 21 in which the coating contains submicron nanoparticle inclusions of a metal compound, a metal, or carbon.

23. A composite of claim 1 in which the coating contains less than 1 wt. % halogen.

24. A composite of claim 1 which is planarized.

25. A composite of claim 1 which is non-porous.

26. A composite comprising a glass, ceramic, or glass-ceramic combination substrate and a substantially amorphous and substantially non-porous aluminum phosphate coating on the substrate in which the coating has at least one additional component selected from the group consisting of a transparent conducting oxide, an ultraviolet light absorbing component, an infra-red light absorbing component, and an infra-red light reflecting component.

27. A composite of claim 26 in which the substrate is a soda-lime glass, a borosilicate glass, or an aluminosilicate glass.

28. A composite of claim 26 in which the conducting oxide component is an indium tin oxide.

29. A composite of claim 26 in which the aluminum phosphate coating is formed by heating an alcoholic solution of phosphorus pentoxide and an aluminum salt.

30. A composite of claim 26 in which the aluminum phosphate coating is formed by heating a complex formed by mixing alcoholic solutions of phosphate ester and aluminum salt.

31. A composite of claim 26 in which the substrate is a glass.

32. A composite of claim 26 in which the substrate is a soda-lime glass, borosilicate glass, or aluminosilicate glass.

33. A composite of claim 26 in which the coating is hydrophobic.

34. A composite comprising a glass, a ceramic, or a glass-ceramic combination substrate and a substantially amorphous and substantially non-porous aluminum phosphate coating on the substrate in which the coating contains [—$PO_4$—$AlO_4$—$AlO_6$—$AlO_4$—$PO_4$—] fragments.

35. A composite of claim 34 in which the substrate is a ceramic.

36. A composite of claim 34 in which the substrate is a non-oxide ceramic.

37. A composite of claim 34 in which the substrate is ceramic, tile, alumina, porcelain enamel, mullite, silicon nitride, silicon carbide, or combinations thereof.

38. A composite of claim 34 in which the substrate is silicon carbide.

39. A composite of claim 34 in which the substrate is a glass.

40. A composite of claim 39 in which the substrate is a soda-lime glass, borosilicate glass, or aluminosilicate glass.

41. A composite of claim 34 in which the coating is less than 10 microns thick.

42. A composite of claim 34 in which the coating is 0.05 to 1 micron thick.

43. A composite of claim 34 in which the coating contains submicron nanoparticle inclusions of a metal compound, a metal, or carbon.

44. A composite of claim 34 in which the coating contains submicron nanoparticle inclusions of carbon.

* * * * *

UNITED STATES PATENT AND TRADEMARK OFFICE
CERTIFICATE OF CORRECTION

PATENT NO. : 7,682,700 B2
APPLICATION NO. : 10/642069
DATED : March 23, 2010
INVENTOR(S) : Sankar Sambasivan and Kimberly A. Steiner It is certified that error appears in the above-identified patent and that said Letters Patent is hereby corrected as shown below:

Cover Page 2 under "FOREIGN PATENT DOCUMENTS" should be added:
--WO05003033    01/2005--

Sheet 10 of 10 - Figure 13 should be added:

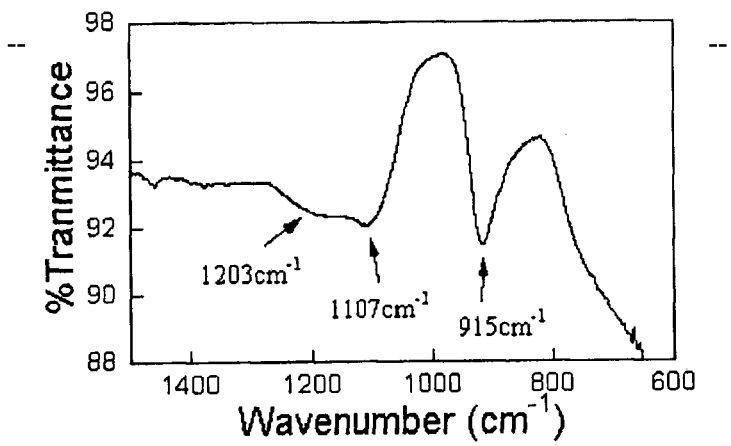

Figure 13. ATR spectrum of inventive aluminophosphate material coated silicon carbide Signed and Sealed this Twenty-third Day of November, 2010

David J. Kappos
*Director of the United States Patent and Trademark Office*